(12) United States Patent
Kandekar et al.

(10) Patent No.: US 9,507,785 B2
(45) Date of Patent: Nov. 29, 2016

(54) FLEXIBLE CONTENT STORAGE MANAGEMENT FOR DVRS

(75) Inventors: Kunal Kandekar, Jersey City, NJ (US); Christopher M. Amidon, Apex, NC (US); Hugh Svendsen, Chapel Hill, NC (US)

(73) Assignee: ELOY TECHNOLOGY, LLC, Wilmington, DE (US)

( * ) Notice: Subject to any disclaimer, the term of this patent is extended or adjusted under 35 U.S.C. 154(b) by 1025 days.

(21) Appl. No.: 13/116,035

(22) Filed: May 26, 2011

(65) Prior Publication Data
US 2012/0117339 A1 May 10, 2012

Related U.S. Application Data

(63) Continuation of application No. 12/731,586, filed on Mar. 25, 2010.

(60) Provisional application No. 61/163,086, filed on Mar. 25, 2009, provisional application No. 61/173,628, filed on Apr. 29, 2009.

(51) Int. Cl.
*G06F 17/30* (2006.01)
*G06F 7/00* (2006.01)
*H04L 29/08* (2006.01)

(52) U.S. Cl.
CPC ... *G06F 17/30091* (2013.01); *G06F 17/30073* (2013.01); *H04L 67/10* (2013.01)

(58) Field of Classification Search
CPC ................................................. G06F 17/30091
USPC ........................................... 707/769; 725/87
See application file for complete search history.

(56) References Cited

U.S. PATENT DOCUMENTS

| 5,936,660 | A | 8/1999 | Gurantz |
| 6,269,369 | B1 | 7/2001 | Robertson |
| 6,347,400 | B1 | 2/2002 | Ohkura et al. |
| 6,408,437 | B1 * | 6/2002 | Hendricks et al. ........... 725/132 |
| 6,549,909 | B1 | 4/2003 | Yamauchi et al. |

(Continued)

FOREIGN PATENT DOCUMENTS

| JP | 2008258685 A | 10/2008 |
| WO | 2007/095190 A2 | 8/2007 |
| WO | 2007/096815 A1 | 8/2007 |

OTHER PUBLICATIONS

"About DLNA-DLNA," at <http://www.dlna.org/retail/about_us/>, from the Internet Archive, dated Nov. 13, 2008, copyright 2008, Digital Living Network Alliance, printed Jun. 11, 2012, 1 page.

(Continued)

*Primary Examiner* — Pavan Mamillapalli

(57) ABSTRACT

A media broker comprises a communication interface and a controller associated with the communication interface configured to divide at least one media item into a plurality of media item content layers, assign a priority to each of the plurality of media content item layers and direct one or more media storage devices to store the plurality of media content layers. The controller is configured to subsequently determine when space is needed. In response to determining that space is needed, at least one of the plurality of media content item layers is selected based upon the priority of the at least one of the plurality of media content item layers and deleted.

27 Claims, 23 Drawing Sheets

(56) References Cited

U.S. PATENT DOCUMENTS

| | | | |
|---|---|---|---|
| 6,678,463 | B1 | 1/2004 | Pierre et al. |
| 6,748,382 | B1 | 6/2004 | Mohan et al. |
| 6,775,461 | B2 | 8/2004 | Poslinski et al. |
| 7,143,353 | B2 | 11/2006 | McGee et al. |
| 7,320,137 | B1 | 1/2008 | Novak et al. |
| 7,454,120 | B2 | 11/2008 | Putterman et al. |
| 7,457,511 | B2 | 11/2008 | Putterman et al. |
| 7,522,817 | B2 | 4/2009 | Srinivasan et al. |
| 7,600,243 | B2 | 10/2009 | Brain et al. |
| 7,607,582 | B2 | 10/2009 | Vallabh et al. |
| 7,620,679 | B2 | 11/2009 | Reasor et al. |
| 7,630,999 | B2 | 12/2009 | De Vorchik et al. |
| 7,751,628 | B1 * | 7/2010 | Reisman .................... 382/232 |
| 7,836,095 | B2 | 11/2010 | Adwankar et al. |
| 7,941,448 | B2 * | 5/2011 | Eslambolchi ....... H04L 63/0281 707/792 |
| 8,078,665 | B2 | 12/2011 | Poder et al. |
| 9,165,266 | B2 * | 10/2015 | Boss .................... G06Q 10/06 |
| 9,195,968 | B2 * | 11/2015 | Caldwell ............ H04L 67/2809 |
| 2002/0118954 | A1 | 8/2002 | Barton et al. |
| 2002/0120925 | A1 | 8/2002 | Logan |
| 2002/0143886 | A1 | 10/2002 | Camens |
| 2003/0068155 | A1 | 4/2003 | Vasilevsky et al. |
| 2003/0188320 | A1 | 10/2003 | Shing |
| 2003/0193581 | A1 | 10/2003 | Miyata |
| 2004/0060061 | A1 | 3/2004 | Parker |
| 2004/0078812 | A1 | 4/2004 | Calvert |
| 2004/0091235 | A1 | 5/2004 | Gutta |
| 2005/0015805 | A1 | 1/2005 | Iwamura |
| 2005/0120386 | A1 | 6/2005 | Stone |
| 2005/0165739 | A1 | 7/2005 | Yamamoto et al. |
| 2006/0059521 | A1 | 3/2006 | Lee et al. |
| 2006/0184968 | A1 | 8/2006 | Clayton et al. |
| 2007/0039033 | A1 | 2/2007 | Ota |
| 2007/0050837 | A1 | 3/2007 | Lopez-Estrada |
| 2007/0058924 | A1 | 3/2007 | Yeh |
| 2007/0067409 | A1 * | 3/2007 | Eslambolchi ....... H04L 63/0281 709/217 |
| 2007/0118529 | A1 | 5/2007 | Howell et al. |
| 2007/0122108 | A1 | 5/2007 | Bontempi |
| 2007/0130585 | A1 | 6/2007 | Perret et al. |
| 2007/0150930 | A1 | 6/2007 | Koivisto et al. |
| 2007/0169148 | A1 | 7/2007 | Oddo et al. |
| 2007/0243860 | A1 | 10/2007 | Aiello et al. |
| 2007/0250896 | A1 | 10/2007 | Parker et al. |
| 2008/0022330 | A1 | 1/2008 | Barrett |
| 2008/0056675 | A1 | 3/2008 | Wright et al. |
| 2008/0141048 | A1 | 6/2008 | Palmer et al. |
| 2008/0141317 | A1 | 6/2008 | Radloff et al. |
| 2008/0152315 | A1 | 6/2008 | Peters et al. |
| 2008/0160909 | A1 | 7/2008 | Khedouri et al. |
| 2008/0220541 | A1 | 9/2008 | Wolf et al. |
| 2008/0235746 | A1 | 9/2008 | Peters et al. |
| 2008/0271101 | A1 | 10/2008 | Doherty |
| 2008/0282312 | A1 | 11/2008 | Blinnikka |
| 2008/0300891 | A1 * | 12/2008 | Boss .................... G06Q 10/06 705/1.1 |
| 2008/0300942 | A1 * | 12/2008 | Boss ................ G06Q 10/06315 705/7.25 |
| 2008/0301732 | A1 | 12/2008 | Archer et al. |
| 2009/0010610 | A1 | 1/2009 | Scholl et al. |
| 2009/0013204 | A1 | 1/2009 | Kobayashi et al. |
| 2009/0022477 | A1 | 1/2009 | Petkovic et al. |
| 2009/0100478 | A1 | 4/2009 | Craner et al. |
| 2009/0102983 | A1 | 4/2009 | Malone et al. |
| 2009/0103891 | A1 | 4/2009 | Harris |
| 2009/0265426 | A1 | 10/2009 | Svendsen et al. |
| 2010/0186034 | A1 | 7/2010 | Walker |
| 2010/0235386 | A1 | 9/2010 | Zhao et al. |
| 2012/0114311 | A1 | 5/2012 | Sutherland et al. |
| 2012/0114312 | A1 | 5/2012 | Sutherland et al. |
| 2012/0117103 | A1 | 5/2012 | Farrelly et al. |

OTHER PUBLICATIONS

"Acadia Secure Networks Solutions," copyright 2008, Acadia Secure Networks, LLC, at <http://acadiasecure.com/solutions.aspx>, printed May 28, 2009, 3 pages.

Amon, Peter et al., "File Format for Scalable Video Coding," IEEE Transactions on Circuits and Systems for Video Technology, vol. 17, No. 9, Sep. 2007, IEEE, pp. 1174-1185, 12 pages.

Bataineh, S. et al., "Load Distribution in Daisy Chain & Two-level d-Dimensional Tree Networks Based on Power Consumption," Proceedings of the 5th WSEAS Int. Conf. on Software Engineering, Parallel and Distributed Systems, Feb. 15-17, 2006, Madrid, Spain, pp. 163-168, 6 pages.

Cho, H. K. et al., "A Load-Balancing Routing Considering Power Conservation in Wireless Ad Hoc Networks," Proceedings of the 16th International Workshop on Database and Expert Systems Applications 2005 (DEXA '05), Copenhagen, Denmark, Aug. 22-26, 2005, Issued Aug. 26, 2005, pp. 128-132, IEEE, 5 pages.

"Creating a wireless peer-to-peer network to connect two DVRs," at <http://tivo.com/setupands. . .s/Creating_a_Wireless_Peer_to_Peer_Network_to_Connect_Two_DVRs.html>, from the Internet Archive, dated Jan. 17, 2009, copyright 1998-2009, TiVo, Inc., printed Jun. 11, 2012, 4 pages.

"DIRECTV Customers Surpass One Million DVR Recordings Using the Internet and Mobile Phones," Jul. 10, 2008, El Segundo, California, copyright 2009, DIRECTV, Inc., at <http://www.directv.com/DTVAPP/global/contentPage.jsp?assetId=P4120004>, printed on May 8, 2009, 9 pages.

"Jungo Media Server: An Integrated Managed UPnP AV Media Server for Jungo-Powered Gateways," at <http://www.jungo.com/openrg/datasheets/jungo_dsheet_media_server.pdf>, copyright 2008, Jungo, 2 pages.

Lin, Z.-R. and Chen, M.-S., "Design and Performance Study of Scalable Video Storage in a Disk-Array-Based Video Server," Electrical Engineering Department, Naional Taiwan University, Taipei, Taiwan, Multimedia and Expo 2000, ICME 2000, vol. 3, 2000, pp. 1341-1344, also at <http://www2.ee.ntu.edu.tw/~mschen/paperps/scvp.pdf>, 4 pages.

Linder, Brad, "TiVo and Amazon to let you buy stuff from the comfort of your couch," posted Jul. 22, 2008, at <http://www.aoltv.com/2008/07/22/tivo-and-amazon-to-let-you-buy-stuff-from-the-comfort-of-your-co/>, copyright 2012, TheHuffingtonPost.com, Inc., printed Jun. 11, 2012, 8 pages.

"Miro—a DVR for internet video," Aug. 1, 2007, copyright 2006-2007, Tech Wandering, at <http://www.techwandering.com/2007/08/01/miro-a-dvr-for-internet-video/>, printed May 8, 2009, 4 pages.

"MythTV," at <http://www.mythtv.org/>, from the Internet Archive, dated Dec. 17, 2008, copyright 2002-2006, Isaac Richards, printed Jun. 11, 2012, 2 pages.

"NDS Announces Peer-to-Peer Content Sharing and Distributed-DVR Capabilities, Lowering Costs for IPTV Operators," Jan. 29, 2007, London, UK, at <http://www.nds.com/newspdfs/DPVR_ShareTV_290107.pdf>, 2 pages.

"North American Consumer DVR and Space-shifting Devices Markets," at <frost.com/prod/.../report-brochure.pag?...>, Aug. 31, 2005, Frost & Sullivan Research Service, printed Feb. 24, 2010, 6 pages.

Rong, P. and Pedram, M., "Extending the Lifetime of a Network of Battery-Powered Mobile Devices by Remote Processing: A Markovian Decision-Based Approach," Proceedings of the 40th Conference on Design Automation, Jun. 2-6, 2003, Anaheim, California, 6 pages.

"Set-Top Box SoCs enable multi-room DVR throughout home," Sep. 15, 2009, Product News Network, at <http://www.allbusiness.com/entertainment-arts/broadcasting-industry/12963561-1.html>, copyright 1999-2010, AllBusiness.com, Inc., printed Apr. 12, 2010, 3 pages.

"The first P2P PVR from NDS plus innovative 'Distributed DVR'," posted by Snipe, Jan. 29, 2007, at <http://tech.commongate.com/post/The_first_P2P_PVR_from_NDS_plus_innovative_Dis-

(56) References Cited

OTHER PUBLICATIONS tributed_DVR/>, TechGate, from Internet Archive, dated Dec. 4, 2008, copyright 2007, CommonGate, printed Jun. 11, 2012, 3 pages.
"TiVo DVR Features," at <http://www.tivo.com/whatistivo/tivodvrfeatures/control_tv.html>, from the Internet Archive, dated Feb. 7, 2009, copyright 1998-2009, TiVo Inc., printed Jun. 11, 2012, 3 pages.
"UPnP(TM) Standards," at <http://upnp.org/standardizeddcps/default.asp>, from the Internet Archive, dated Jan. 21, 2009, copyright 1999-2009, Contributing Members of the UPnP(TM) Forum, printed Jun. 11, 2012, 2 pages.
"Verizon Announces Multi-Room Home Media DVR," Aug. 14, 2006, PRNewswire, BestStuff.com, at <http://www.beststuff.com/categories/fromthewire/audiovideo-news/verizon-announces-multi-room-home-media-dvr.html>, printed Apr. 12, 2010, 2 pages.
"Watch NetFlix streaming video on your TV without using a computer with the Roku NetFlix Player," May 30, 2008, copyright 2006-2007, TechWandering, at <http://www.techwandering.com/2008/05/30/how-to-watch-netflix-streaming-video-on-your-tv-without-using-a-computer/>, printed May 8, 2009, 8 pages.
Wiegand, T. et al., "Overview of the H.264/AVC Video Coding Standard," IEEE Transactions on Circuits and Systems for Video Technology, vol. 13, No. 7, Jul. 2003, IEEE, pp. 560-576, 17 pages.

\* cited by examiner

| MEDIA STORAGE DEVICE DATA STRUCTURE 56 ||
|---|---|
| NAME | 60 |
| DESCRIPTION | 62 |
| CAPABILITIES | 64 |
| SERIAL NUMBER | 66 |
| MANUFACTURER | 68 |
| MODEL | 70 |
| GUIDE | 72 |
| LOGS | 74 |
| SERVICE | 76 |
| STATE | 78 |
| LOCATION | 80 |
| PREFERENCE SETTINGS | 82 |
| WEB SERVER | 84 |
| DEVICE PROFILE | 86 |

*FIG. 3*

| DEVICE PROFILE | 86 |
|---|---|
| WATCH HISTORY | 88 |
| RECORD HISTORY | 90 |

*FIG. 4*

| Jack: Personal Content Queue | |
|---|---|
| | Desired Duration: 1 Hour ▶ |
| ◀ Alphabetical ▶ | |
| ◀ Date ▶ | Title: Planet Earth - Deserts<br>Genre: Nature Documentary<br>Users: Dad, Suzy<br>Description: Deserts of the Earth, from Death Valley in the US to the Gobi Desert in China | Recorded: 3/31/2008<br>Rating: 5 Stars |
| ◀ Channels ▶ | | |
| ◀ Genre ▶ | Title: Planet Earth - Oceans<br>Genre: Nature Documentary<br>Users: Dad, Suzy<br>Description: Oceans of the Earth. | Recorded: 3/31/2008<br>Rating: 5 Stars |
| ◀ Rating ▶ | | |
| ◀ User ▶ | | |
| ◀ Deletion ▶ | Title: Law & Order SVU: Hot House<br>Genre: Drama | Recorded: 1/13/2009<br>Rating: 4 Stars |

Title: Planet Earth - Deserts  
Duration: 3 Hours  
Genre: Nature Documentary  
Watched: Suzy - 6/19/2008, Jack - 7/1/2008  
Recorded: 3/31/2008  
Subscriptions: Suzy, Dad, Jack  
Rating: 5 Stars  
Description: Deserts of the Earth, from Death Valley in the US to the Gobi Desert in China

FIG. 20A

Title: Law & Order SVU: Hot House  
Duration: 1 Hour  
Genre: Drama  
Watched: Jack - 2/10/2009  
Recorded: 1/13/2009  
Subscriptions: None  
Rating: 4 Stars  
Description: Detective Benson goes undercover as a Madame to investigate the murder of a child prodigy living a double life.

FIG. 20B

| Attribute | Program #1 - Planet Earth | Program #2 - Law & Order SVU |
|---|---|---|
| Age | 10 (older - 3/31/2008) | 1 (younger - 1/13/2009) |
| Size | 10 (longest - 3 hours) | 1 (shortest - 1 hour) |
| Subscription Content | 1 (yes - Suzy, Jack, Dad) | 11 (no subscribers) |
| Users Watched | 5 (2 users have watched, but Dad counts twice, so only half of the subscribed users have watched) | 10 (1 user watched, no subscribers so program has been watched) |
| Time between Watches | 10 (Jack and Suzy watched) | 1 (no user subscriptions) |
| Last Watched | 10 (longest time since last watched - Jack 7/1/2008) | 1 (shortest time since last watched - Jack 2/10/2009) |
| Genre | 1 (family likes nature documentaries) | 10 (family doesn't like dramas) |
| Rating | 1 (higher rated - 5 stars) | 10 (lower rated - 4 stars) |
| Total | 48 | 45 |

*FIG. 21*

FLEXIBLE CONTENT STORAGE MANAGEMENT FOR DVRS

RELATED APPLICATIONS

This application is a continuation of U.S. patent application Ser. No. 12/731,586 filed Mar. 25, 2010, entitled SYSTEM AND METHOD FOR INTELLIGENT STORAGE OF TIME SHIFTED CONTENT, which claims the benefit of provisional patent application Ser. No. 61/163,086, filed Mar. 25, 2009, entitled SYSTEM FOR GENERATING PERSONALIZED PREVIEWS IN A MUSIC SHARING NETWORK and provisional patent application Ser. No. 61/173,628, filed Apr. 29, 2009, entitled SYSTEM AND METHOD FOR MULTIPLE BASE LAYER SVC, the disclosures of both are hereby incorporated herein by reference in their entireties.

FIELD OF THE DISCLOSURE

The disclosure relates to a system and method for intelligently controlling the storage of media content items.

BACKGROUND

Traditionally, digital video recorders (DVRs) require a set-top box (STB) with a hard drive contained in it. The hard drive is utilized to record media content item for future viewing. Media item content that is recorded in order to be viewed at a later time is referred to as "time shifted" content. It is further commonplace for a household to have more than one STB each capable of independently recording and playing back media content item.

Unfortunately, because each STB acts independently of other STBs in a home, multiple redundant copies of the same media content item may be recorded on different STBs using up valuable storage space. Furthermore, DVRs are often programmed to record much more content than they are able to store. As a result, recorded content must often times be erased to make space for a new media item before a user has an opportunity to consume the media item.

As such, there exists a need to reduce or eliminate the unnecessary recording of multiple copies of the same time-shifted media item in a home with multiple STBs and multiple media storage repositories, such as DVRs. There further exists a need to store recorded media items in a manner that avoids or otherwise prevents the deletion of unwatched media items.

SUMMARY

In accordance with an exemplary and non-limiting embodiment, a media broker comprises a communication interface and a controller associated with the communication interface configured to receive a request from a user to record a requested media item. The media broker proceeds to query an aggregated stored content list (ASCL) comprising information indicative of each of one or more media items stored on one or more media storage devices communicatively coupled to the media broker to determine if the requested media item is stored on the one or more media storage devices. If it is determined that the requested media item is stored on the one or more media storage devices, the user that requested the media item is informed that the media item is stored on the one or more media storage devices. Conversely, if it is determined that the requested media item is not stored on the one or more media storage devices, the requested media item is recorded.

In accordance with another exemplary and non-limiting embodiment, a computer-readable medium embodied in an article of manufacture is encoded with instructions for directing a processor of a media broker to receive a request from a user to record a requested media item. The processor is further directed to query an aggregated stored content list (ASCL) comprising information indicative of each of one or more media items stored on one or more media storage device communicatively coupled to the media broker to determine if the requested media item is stored on the one or more media storage devices. If it is determined that the requested media item is stored on the one or more media storage devices the user that requested the media item is informed and the media item is stored on the one or more media storage devices. Conversely, if it is determined that the requested media item is not stored on the one or more media storage devices, the requested media item is recorded.

In accordance with another exemplary and non-limiting embodiment, a method includes receiving a request from a user to record a requested media item. An aggregated stored content list (ASCL) comprising information indicative of each of one or more media items stored on one or more media storage devices is queried to determine if the requested media item is stored on the one or more media storage devices. If it is determined that the requested media item is stored on the one or more media storage devices, the user that requested the media item is informed that the media item is stored on the one or more media storage devices. Conversely, if it is determined that the requested media item is not stored on the one or more media storage devices, the requested media item is recorded.

In accordance with an exemplary and non-limiting embodiment, a media broker comprises a communication interface and a controller associated with the communication interface configured to receive a request from a user to record a requested media item series. The media broker proceeds to query an aggregated series recording list (ASRL) comprising information indicative of each media item series requested to be recorded on one or more media storage devices communicatively coupled to the media broker to determine if the requested media item series is already requested to be recorded. If it is determined that the requested media item series is already requested to be recorded, the user is informed that the requested media item series is already requested to be recorded. Conversely, if it is determined that the requested media item series is not already requested to be recorded, a request to record the requested media item series is stored in the ASRL.

In accordance with another exemplary and non-limiting embodiment, a computer-readable medium embodied in an article of manufacture is encoded with instructions for directing a processor to receive a request from a user to record a requested media item series. The processor proceeds to query an aggregated series recording list (ASRL) comprising information indicative of each media item series requested to be recorded on one or more media storage devices to determine if the requested media item series is already requested to be recorded. If it is determined that the requested media item series is already requested to be recorded, the user is informed that the requested media item series is already requested to be recorded. Conversely, if it is determined that the requested media item series is not already requested to be recorded, a request to record the requested media item series is stored in the ASRL.

In accordance with another exemplary and non-limiting embodiment, a method includes receiving a request from a user to record a requested media item series, querying an aggregated series recording list (ASRL) comprising information indicative of each media item series requested to be recorded on one or more media storage devices to determine if the requested media item series is already requested to be recorded, informing the user that the requested media item series is already requested to be recorded if it is determined that the requested media item series is already requested to be recorded and storing a request to record the requested media item series in the ASRL if it is determined that the requested media item series is not already requested to be recorded.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3 is a diagram of a media storage device data structure according to an exemplary embodiment;

FIG. 4 is a diagram of a device profile according to an exemplary embodiment;

FIG. 16 is an illustration of an exemplary GUI for displaying a personal content queue according to an exemplary embodiment;

FIG. 17 is an illustration of an exemplary GUI for displaying an aggregate content queue according to an exemplary embodiment;

FIG. 18 is an illustration of another exemplary GUI for displaying an aggregate content queue according to another exemplary embodiment;

FIGS. 20A and 20B are illustrations of information associated with exemplary media items;

FIG. 21 is an illustration an exemplary table showing the metrics determined and applied to each media item according to an exemplary embodiment;

DETAILED DESCRIPTION

Figure 1:
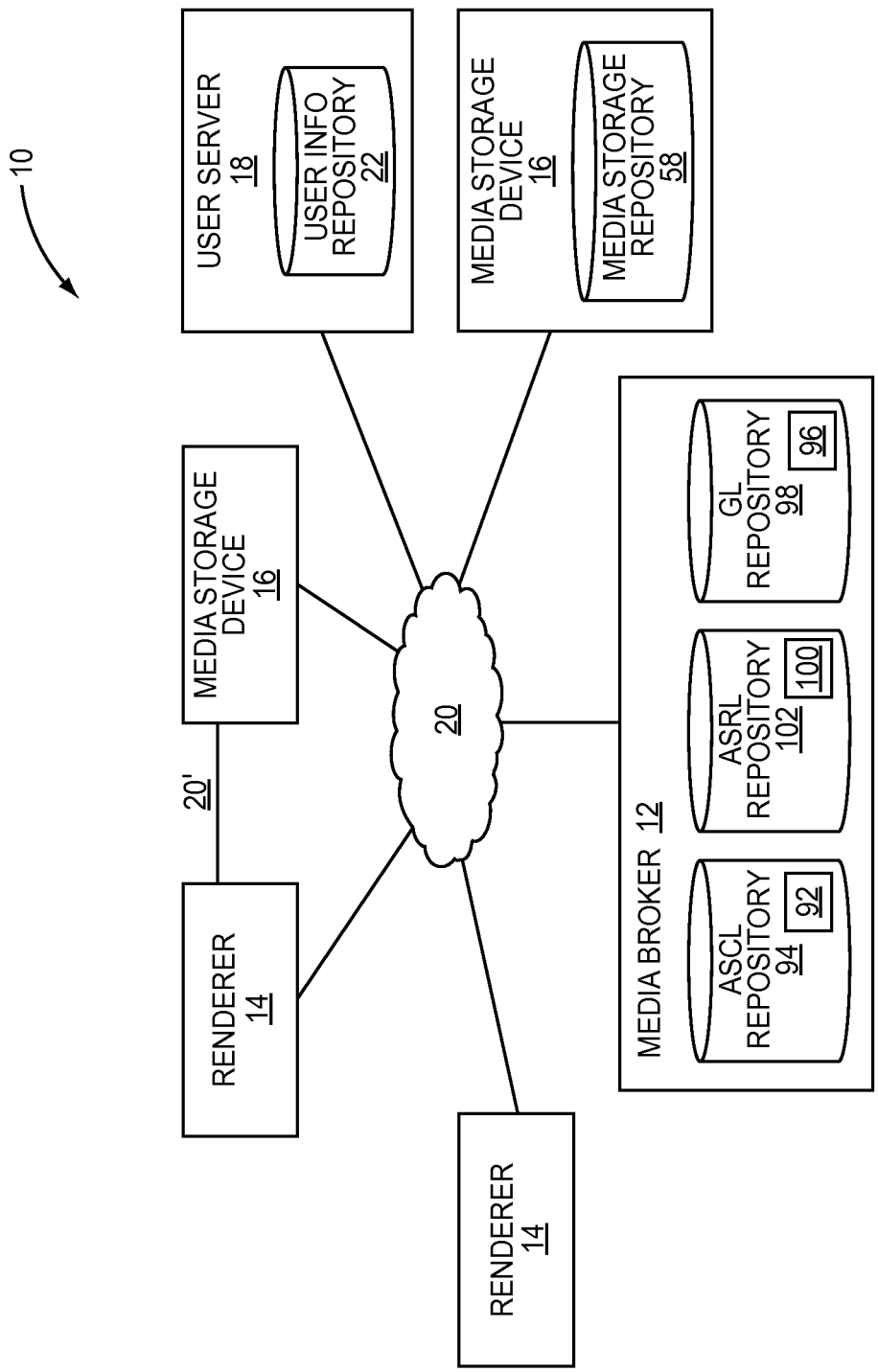
FIG. 1 illustrates a system incorporating a network for communicatively coupling a media broker to one or more renderers and media storage devices according to an exemplary embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In accordance with an exemplary and non-limiting embodiment, a media broker comprises a communication interface and a controller associated with the communication interface configured to receive a request from a user to record a requested media item. The media broker proceeds to query an aggregated stored content list (ASCL) comprising information indicative of each of one or more media items stored on one or more media storage devices communicatively coupled to the media broker to determine if the requested media item is stored on the one or more media storage devices. If it is determined that the requested media item is stored on the one or more media storage devices, the user that requested the media item is informed that the media item is stored on the one or more media storage devices and the user is provided access to the media item. Conversely, if it is determined that the requested media item is not stored on the one or more media storage devices, the requested media item is recorded.

In accordance with an exemplary and non-limiting embodiment a media broker comprises a communication interface and a controller associated with the communication interface configured to receive a request from a user to record a requested media item series. The media broker proceeds to query an aggregated series recording list (ASRL) comprising information indicative of each media item series requested to be recorded on one or more media storage devices communicatively coupled to the media broker to determine if the requested media item series is already requested to be recorded. If it is determined that the requested media item series is already requested to be recorded, the user is informed that the requested media item series is already requested to be recorded. Conversely, if it is determined that the requested media item series is not already requested to be recorded, a request to record the requested media item series is stored in the ASRL.

In accordance with an exemplary and non-limiting embodiment a media broker comprises a communication interface and a controller associated with the communication interface configured to identify a media item stored on a media storage device not associated with a renderer on which the media item is most regularly viewed. Then, the identified media item is moved to a media storage device associated with a renderer on which the media item is most regularly viewed.

In accordance with an exemplary and non-limiting embodiment a media broker comprises a communication interface and a controller associated with the communication interface configured to divide a media item into a plurality of media content item layers and assign a priority to each of the plurality of media content item layers. The media content item layers are stored and at least one of the plurality of media content item layers is deleted based upon the priority of the at least one of the plurality of media content item layers.

In accordance with an exemplary and non-limiting embodiment a media broker comprises a communication interface and a controller associated with the communication interface configured to divide a media item into a plurality of media content item segments and assign a priority to each of the plurality of media content item segments. The media content item segments are stored and at least one of the plurality of media content item segments is deleted based upon the priority of the at least one of the plurality of media content item segments.

In accordance with an exemplary and non-limiting embodiment a media broker comprises a communication interface and a controller associated with the communication interface configured to receive information from a user defining a recording subscription profile comprising one or more user preferences each associated with an attribute of a media item. The recording subscription profile is stored and one or more media items having one or more associated attributes that match all of the one or more user preferences is recorded.

In accordance with an exemplary and non-limiting embodiment a media broker comprises a communication interface and a controller associated with the communication interface configured to determine that a system storage capacity exceeds a predetermined threshold. One or more metrics is determined for each of at least one media item and, in response to the system storage capacity exceeding the predetermined threshold, one or more of the at least one media item is deleted based upon the one or more metrics.

In accordance with exemplary embodiments disclosed herein, the problem of needlessly recording multiple copies of the same time-shifted media content item in a home with multiple television tuners and multiple networked storage repositories is solved by creating an aggregate content catalog from all media storage devices in a home system, cross referencing the aggregate content catalog with a channel guide, and optimizing the storage of the media item to the media storage device, such as a DVR, where the media item is most likely to be viewed.

FIG. 1 illustrates a system 10 incorporating a media broker 12 communicatively coupled to a one or more renderers 14, one or more media storage devices 16, and at least one repository of user information, such as user server 18.

As used herein, a "viewer" of a display device or renderer 14 for whom associated user information is stored, for example, in user server 18, may be interchangeably referred to as a "user" of system 10.

As used herein, "renderer" refers to any device capable of receiving a media item and displaying, playing or otherwise rendering the media item. Examples of renderers 14 include, but are not limited to, laptop computers, desktop computers, personal digital assistants (PDAs), mobile telephones, televisions (TVs), portable game players, and the like.

As used herein, "media storage device" refers to any and all devices capable of storing and outputting upon request one or more media items. Examples of media storage devices 16 include, but are not limited to, data servers, digital video recorders (DVRs), computers, and the like.

As used herein, "media broker" refers to any device capable of (1) communicating with one or more media storage devices 16 to determine a set of media items stored on and accessible from the one or more media storage devices 16, and optionally the media broker 12, (2) receiving requests from renderers 14 for media items stored on one or more media storage devices 16, and optionally the media broker 12, (3) and facilitating the streaming or transfer of a requested media item from a media storage device 16 or the media broker 12 to a renderer 14. As described more fully below, in an exemplary embodiment, media broker 12 operates as a centralized gatekeeper to receive requests from a renderer 14 at a known location to view or record a media item. Media broker 12 then determines if the requested media item is already resident at a media storage device 16, and, if appropriate, media broker 12 moves the media item to a media storage device in physical proximity to a renderer 14 at which the media item is likely to be viewed. Described in detail below, media broker 12 may include an aggregated stored content list (ASCL) 92 stored in an ASCL repository 94, an aggregated series recording list (ASRL) 100 stored in an ASRL repository 102, and a guide list (GL) 96 stored in a GL repository 98.

While renderers 14, user server 18, and media storage devices 16 are described herein as separate and distinct entities, the present disclosure is drawn broadly to encompass devices which may combine the function of one or more renderers 14, user server 18, and/or media storage devices 16 in a single device. As used herein, when referring to a device that incorporates, for example, both rendering and media content storage capabilities, such as a personal computer, references to a "renderer 14" and "media storage device 16" refer to those subsets of functionality of the device devoted to the performing the referenced functions.

As illustrated, the communicative coupling of media broker 12 to individual renderers 14, media storage devices 16 and user server 18 may be facilitated via network 20. Network 20 may be a hard wired local area network (LAN), a wireless network, or some combination thereof. As a result, media broker 12 can communicate with every renderer 14, media storage device 16 and user server 18 directly via the network 20. In addition to the network 20, various renderers 14, media storage devices 16 and user server 18 may engage in direct wireless communication with the media broker 12 according to, for example, one of the suite of IEEE 802.11 standards, the Bluetooth standard, or the like.

In general, as described more fully below in accordance with an exemplary embodiment, media broker 12 operates to aggregate a content catalog from all media storage devices 16, cross reference the aggregate content catalog with a channel guide, and optimize the storage of the media item to the media storage device 16 where the media item is most likely to be viewed.

In some exemplary embodiments, media broker 12 facilitates communication between a media storage device 16 and a renderer 14, such as via a direct point-to-point local wireless communication link 20', whereby data flows between a media storage device 16 and a renderer 14. In such embodiments, the media broker 12 supervises establishing the communication link 20' between the media storage device 16 and the renderer 14, and may monitor the communication link 20'. For example, the media broker may enable a renderer 14 to receive and play a media item, such as a streaming music video, from media storage device 16 via communication link 20'. The communication link 20' may be a Bluetooth connection, a connection involving one of the suite of IEEE 802.11 standards, or the like.

As noted above, a renderer 14 may also have media storage capabilities. For example, renderer 14 may be a desktop computer. Renderer 14 may incorporate a media storage device 16 for storing media items that may be viewed on a screen also forming a part of renderer 14. In such an instance, the renderer 14 may still access the media item via a request sent to media broker 12 acting as a proxy for a media item stored on the renderer's media storage device 16.

User server 18 may store information associated with a user of the system including, but not limited to, information uniquely identifying a user, user preferences, system attributes and the like. User server 18 may include a user information repository 22 for storing associated user information. Examples of information uniquely identifying a user include, but are not limited to, a unique alphanumeric or numeric identifier, a voice print, facial recognition parameters, login and password information and the like. Examples of system attributes include, but are not limited to, designations of system administrator, media item rating clearances and the like.

Figure 2:
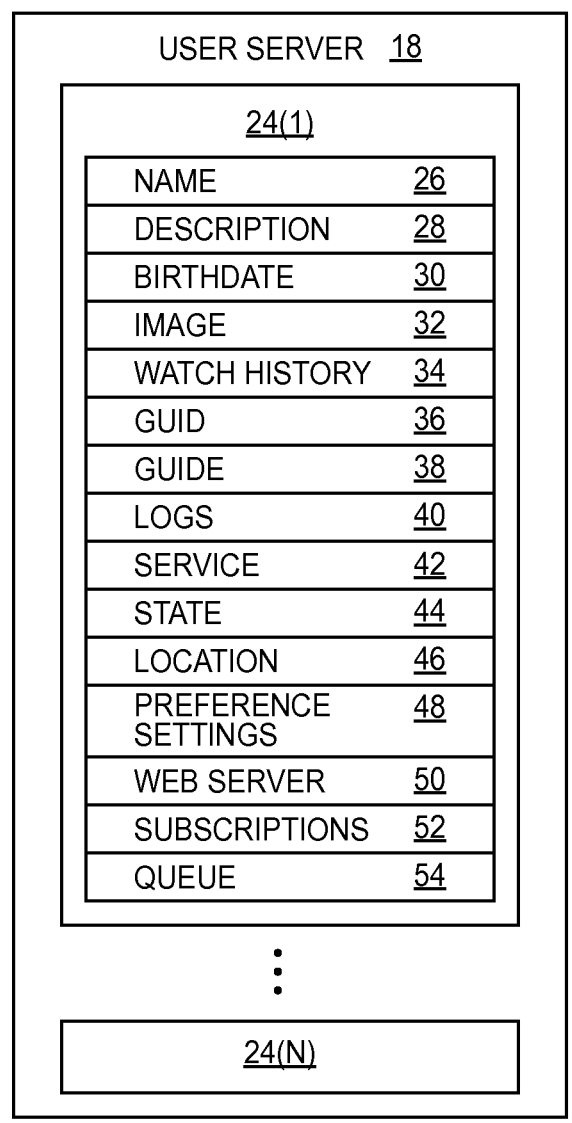
FIG. 2 is a schematic diagram of a user server according to an exemplary embodiment.

FIG. 2 is an illustration of an exemplary embodiment of a media user server 18 for storing data associated with a user. User data structures 24(1) through 24(N) may be stored at the user server 18, such as in a user information repository 22, and queried by media broker 12. A user data structure 24 is stored for each user of the system 10. In another exemplary embodiment, media broker 12 stores a user data structure 24 associated with each user locally.

Exemplary data fields of user data structure 24 include, but are not limited to, name 26 for uniquely identifying a user, description 28 for storing a textual description a user, birthday 30 for recording a user's birthday, image 32 for storing an image of a user, watch history 34 for storing the individual watch habits of a user, GUID 36 for storing a Globally Unique Identifier, guide 38 for storing a channel guide, logs 40 for storing past actions associated with a user, service 42 for storing a service identifier, state 44 for storing a user state, location 46 for storing a user's preferred viewing locations, preference settings 48 for recording the viewing preferences of a user, web server 50 for storing one or more web server identifiers, subscriptions 52 for storing one or more user subscriptions, and queue 54 for storing information related to the identity of a media item recorded or scheduled to be recorded in a manner associated with a preference of the user.

FIG. 3 is an illustration of an exemplary embodiment of a media storage device data structure 56 for storing data associated with a media storage device 16. Media storage device data structure 56 may be stored at a media storage device 16, such as in a media storage repository 58, and queried by media broker 12. Media storage repository 58 may also store media items. In another exemplary embodiment, media broker 12 stores a media storage device data structure 56 associated with each media storage device 16 locally and periodically queries each media storage device 16 to populate each media storage device data structure 56.

Exemplary data fields of media storage device data structure 56 include name 60 for uniquely identifying a media storage device 16, description 62 for storing a textual description a media storage device 16, capabilities 64 for describing functional attributes of a media storage device 16, serial number 66 for storing a manufacturer's identifying serial number for a media storage device 16, manufacturer 68 for indicating the manufacturer of a media storage device 16, model 70 for identifying a model of a media storage device 16, guide 72 for storing channel guide information accessible to a media storage device 16, logs 74 for recording history information associated with the operation of a media storage device 16, service 76 for recording service information of a media storage device 16, state 78 for recording a current state of a media storage device 16, location 80 for indicating a physical location of a media storage device 16, preference settings 82 for recording one or more viewer preferences governing the operation of a media storage device 16, web server 84 for storing information associated with web server connectivity, and device profile 86 for storing information associated with the viewing history and recording history of a media storage device 16.

FIG. 4 is an illustration of device profile 86 showing subfields watch history 88 and record history 90. Watch history 88 records information indicative of individual media items viewed from the associated media storage device 16, information derived from viewed media item (e.g., preferred genres, statistical compilations of watch patterns and the like), and combinations thereof. Record history 90 records information related to a media item that has been recorded in the past, is presently being recorded or that it is to be recorded in the future.

As noted above, one problem arising from system 10 comprising a plurality of media storage devices 16 in a home is the tendency to accumulate duplicate copies of media items of interest to one or more viewers. In general, media items recorded and stored in a media storage device 16 may be time shifted in three ways. First, a user can record a media item that they are currently watching on a renderer 14 such as by clicking a record button on a remote. Second, a user may call up a channel guide, such as from a media storage device 16 and displayed on a renderer 14, navigate to a channel and media item of interest, and request system 10 to record the media item at some point in the future. Third, a user may program media storage device 16 to always record new media items or episodes, of a particular series.

The following example illustrates an exemplary embodiment according to the disclosure below. Fred has three media storage devices 16 in his house. Fred is watching a media item on TNT in the living room. Fred realizes that his wife might want to watch the media item when she comes home from her mother's house. Fred clicks the record button to automatically start recording the media item. Fred's DVR shows him a message indicating that Fred's daughter had already recorded the media when it played earlier on TNT.

The media item is on the DVR in his daughter's room. As a result, the recording is cancelled thus saving storage space for other media items.

Figure 5:
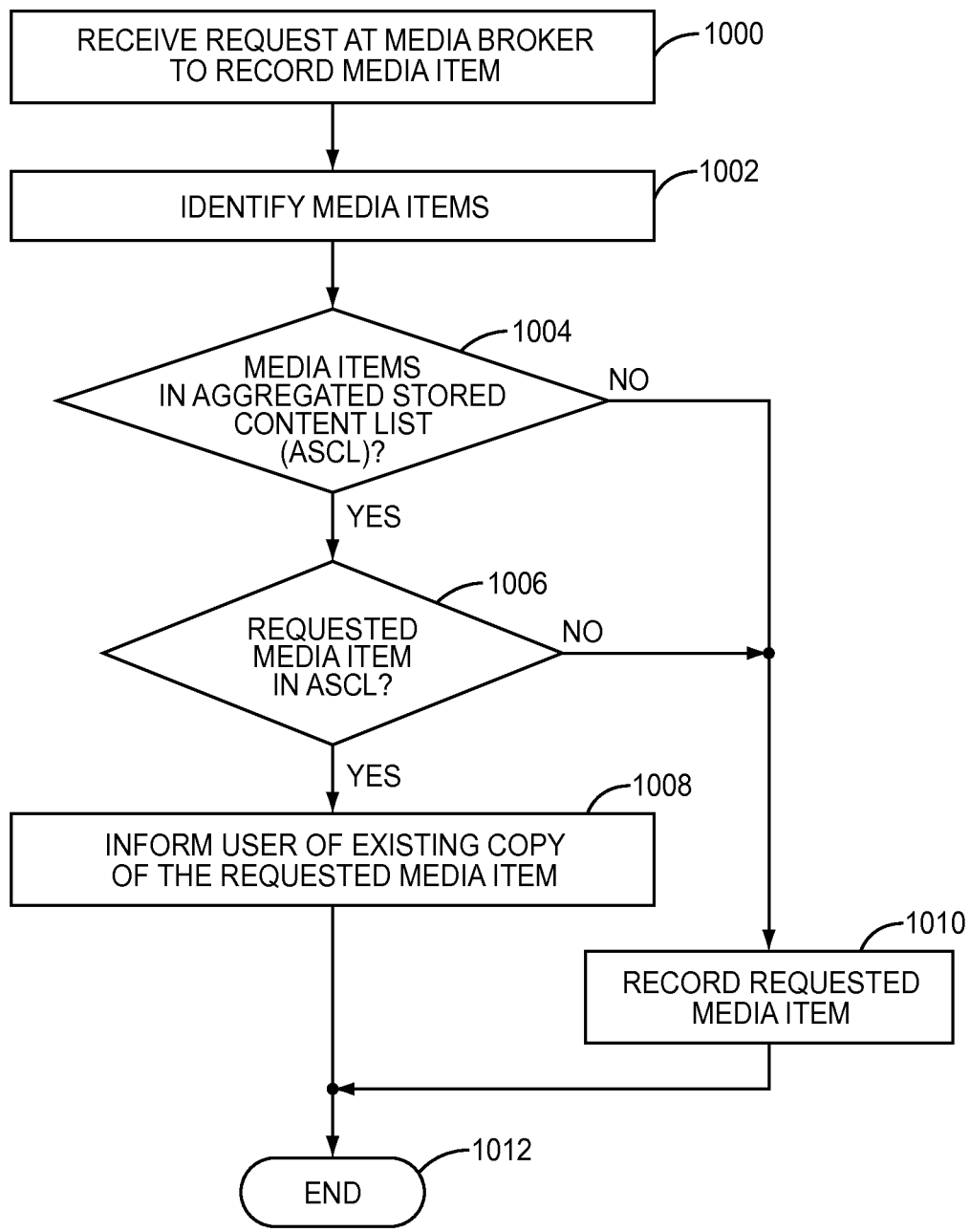
FIG. 5 is a flow chart illustrating the operation of the system of FIG. 1 when recording a media item according to an exemplary embodiment.

FIG. 5 is an illustration of a flowchart of an exemplary embodiment of the operation of media broker 12 for preventing a duplicate recording of a media item as described immediately above. Media broker 12 operates to periodically query each media storage device 16 and/or each media storage device data structure 56 associated therewith to create an aggregated stored content list (ASCL) 92 indicative of media items stored on each media storage device 16. Media broker may query each media storage device data structure 56 at predefined times or time intervals or may perform such queries in response to a trigger, including, but not limited to a recording of a media item at a media storage device 16. Regardless of the manner by which media broker 12 creates the ASCL 92 and stores it for access, such as in ASCL repository 94, once created and/or updated, media broker 12 may access ASCL 92.

First, upon receiving a request to record a media item that is currently being displayed upon a renderer 14, hereinafter referred to as the "requested media item", media broker 12 accesses data identifying the media item. For example, media broker 12 accesses a media storage device data structure 56 associated with a media storage device 16 communicatively coupled to renderer 14 on which the media item is being displayed and accesses the guide 72 to determine an identity of the media item (steps 1000-1002). Next, the media broker 12 checks to determine if the ASCL 92 indicates that there are any media items stored in any media storage devices 16 (step 1004). If there are no recorded and stored media items, processing proceeds to step 1010 whereat media broker 12 directs a media storage device 16 having available storage space, and access to the appropriate channels, to record and store the media item.

If it is determined that ASCL 92 indicates that there are stored media items, the media broker 12 performs a query to see if ASCL 92 indicates that the requested media item is stored in a media storage device 16 (step 1006). If it is determined that an instance of the requested media item is resident in a media storage device 16, the media broker 12 transmits a message to the user indicating an existing recording of the requested media item (e.g., displayed on the renderer 14 from which the user transmitted the request for the requested media item) (step 1008), optionally cancels the current record request, and the process ends (step 1012). If it is determined that an instance of the requested media item is not resident at a media storage device 16, processing is directed to step 1010 whereat media broker 12 directs a media storage device 16 having available storage space to record and store the media item. After directing a media storage device 16 to record the media item content (step 1010) processing ends (step 1012).

The following example illustrates an exemplary embodiment according to the disclosure below. Fred has three DVRs in his house. Fred would like to record a media item that he saw advertised on the TNT network. Fred calls up the user guide, selects the TNT channel and goes to record the media item. TNT has already played the media item Fred wanted several times that weekend. The channel guide shows Fred that his daughter recorded the media item earlier on the DVR upstairs in her room. As a result, Fred closes the channel guide, knowing now that the media item has already been recorded for his later enjoyment.

Figure 6:
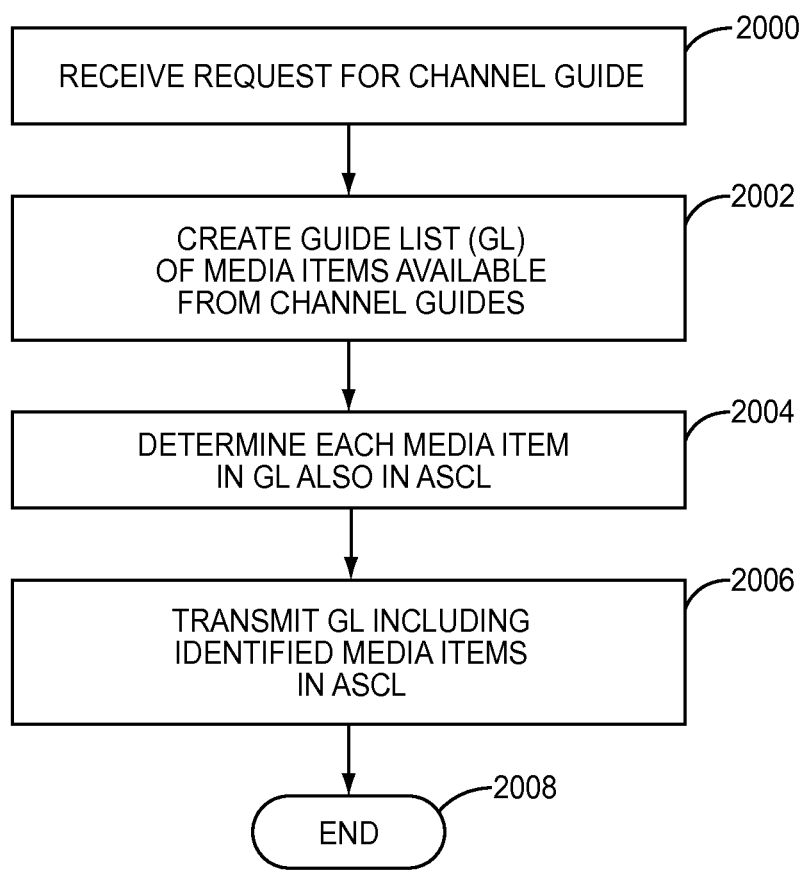
FIG. 6 is a flow chart illustrating the operation of the system of FIG. 1 when providing a guide list to a user according to an exemplary embodiment.

FIG. 6 is an illustration of a flowchart of an exemplary embodiment of the operation of media broker 12 for preventing a duplicate recording of a media item as described immediately above. First, a request is received by the media broker 12 for a channel guide such as the result of a viewer pressing a guide button on a remote control associated with a renderer 14 (step 2000). For the purposes of this exemplary embodiment, it is assumed that ASCL 92 has been created and updated as described above. In response to receiving the request, media broker 12 operates to query each media storage device data structure 56 at a media storage device 16 or associated with a media storage device 16, specifically, each guide 72, and construct a guide list (GL) 96 formed as a superset of all media item guide information for all media items in each guide 72 excluding duplicates (step 2002). GL 96 may be stored, for example in GL repository 98. Next, media broker 12 operates to determine if any of the media items included in the GL 96 are likewise in ASCL 92 (step 2004). For example, media broker 12 may perform a search for each media item in ASCL 92 that is also in GL 96 and record each hit.

Then, media broker 12 sends the GL 96 to a renderer 14 associated with the viewer that made the request (step 2006). In an exemplary embodiment, media items listed in the GL 96 that are also in the ASCL 92 are displayed in a different manner than the other media items. For example, media items in the GL 96 may be displayed in blue with media items that are in the ASCL 92 displayed in green. In this manner, it is visually apparent to a viewer that a media item available via the GL 96 is already stored and available for viewing. After providing the GL 96 information is such a manner, the process ends (step 2008).

The following example illustrates an exemplary embodiment according to the disclosure below. Fred has three media storage devices 16 in his house. Fred's daughter is fond of the new TNT series "Leverage" and programs the media storage device 16 in her room to record new episodes. Fred's son is also a fan of the show and, not knowing that his sister is already recording it, he programs the media storage device 16 in the living room to record new episodes as well. Only one copy is retained for both the daughter and son to enjoy later.

Figure 7:
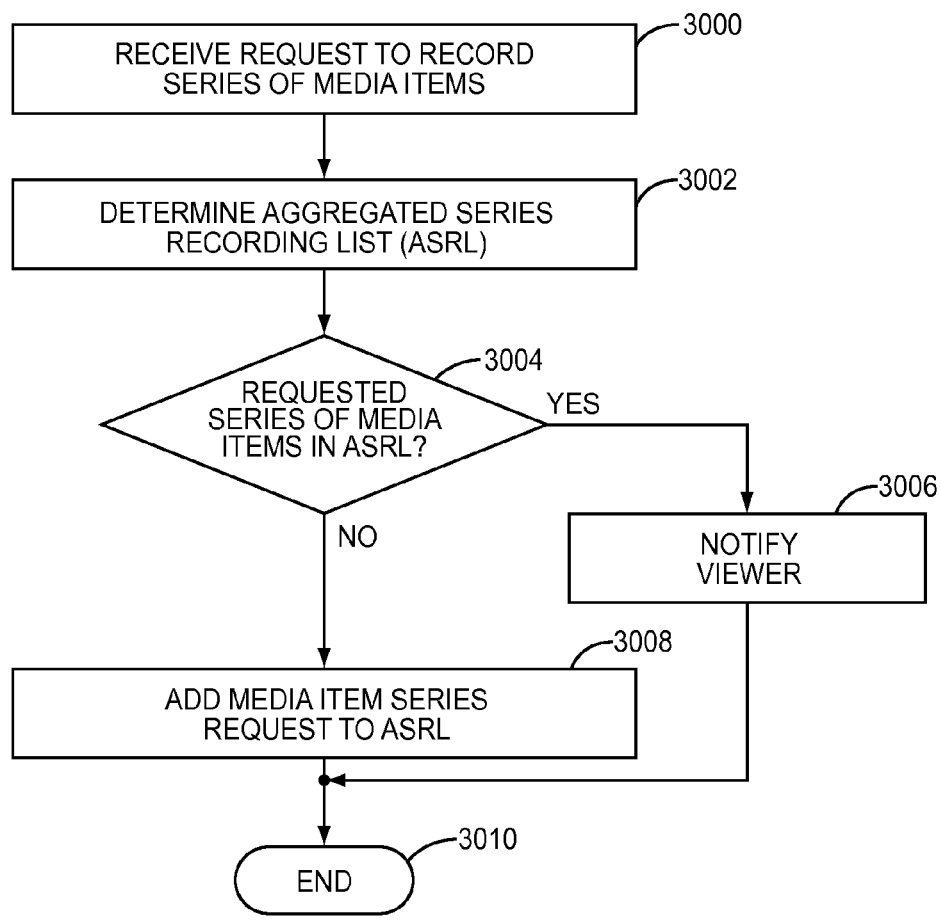
FIG. 7 is a flow chart illustrating the operation of the system of FIG. 1 when recording a series of media items according to an exemplary embodiment.

FIG. 7 is an illustration of a flowchart of an exemplary embodiment of the operation of media broker 12 for preventing a duplicate series recording. First, media broker 12 receives a request to record a series of media items (step 3000). For example, a viewer interacts with media broker 12 via a renderer 14 to display and enable the selection of a desired series comprising related media items that are broadcast periodically.

Media broker 12 proceeds to create an aggregated series recording list (ASRL) 100 (step 3002). Similar to the ASCL 92, media broker 12 operates to periodically query each media storage device 16 and/or each media storage device data structure 56 associated therewith to create an ASRL 100 indicative of one or more media item series requested to be recorded. Such media item series requests may be stored, for example, in preference settings 82. Media broker 12 may query each media storage device data structure 56 at predefined times or time intervals or may perform such queries in response to a trigger, including, but not limited to, a recording of a media item based upon a media item series request. Regardless of the manner by which media broker 12 creates the ASRL 100 and stores it for access, such as in ASRL repository 102, once created and/or updated, media broker 12 may access ASRL 100.

Next, media broker 12 operates to determine if the requested media item series is already scheduled to be recorded via an entry in the ASRL 100 (step 3004). If it is determined that the requested media item series is already scheduled to be recorded via an entry in the ASRL 100, the requesting viewer is notified, such as by a message sent to a renderer 14 associated with the viewer, that the media item series is already set to be recorded (step 3006), optionally cancels the record series request, and the process ends (step 3010). In an exemplary embodiment, media broker 12 may associate user information identifying a requesting viewer with the media series request and store both in the ASRL 100. Then, when media broker 12 receives a request to delete a media item series request from the ASRL 100 from a first user, the same media item series will not be removed if the media item series still has other users associated with it as a result of previous requests to record the media item series from other users.

If, however, at step 3004, it was determined that the requested media item series is not already scheduled to be recorded via an entry in ASRL 100, media broker 12 adds the media item series request to ASRL 100 (step 3008) and the process ends (step 3010).

The following example illustrates an exemplary embodiment according to the disclosure below. Fred has three media storage devices 16 in his house. Fred's daughter is fond of the new TNT series "Leverage" and instructs system 10 to record new episodes which are then recorded on a media storage device 16 in her room. She soon gets the whole family watching the media item as well. The family starts to regularly watch the media item from the living room media storage device. As a result, system 10 operates to shift the media item from the daughter's media storage device to the one in the living room to lessen the load on the network 20. In an exemplary embodiment, network 20 is a home network.

Figure 8:
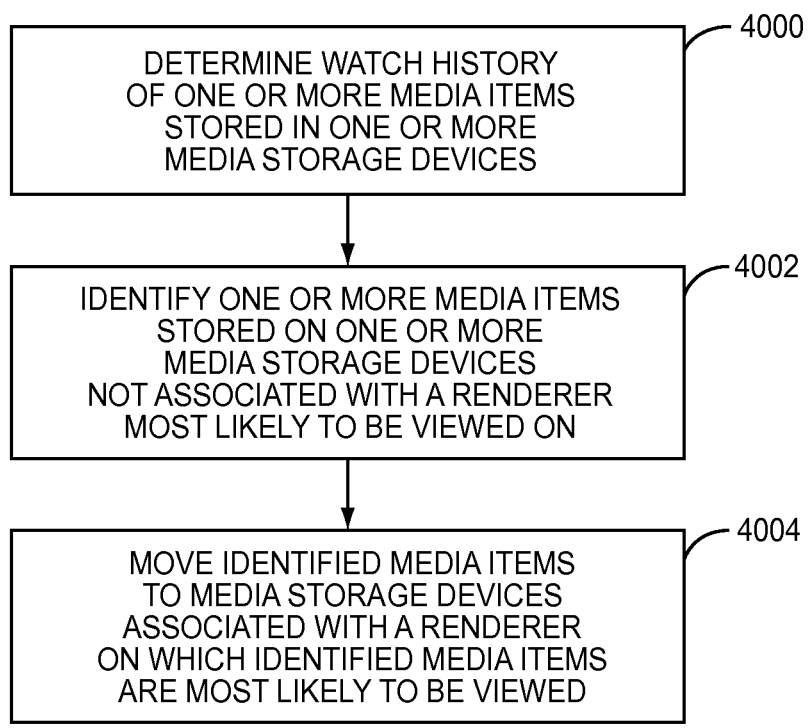
FIG. 8 is a flow chart illustrating the operation of the system of FIG. 1 when moving media items according to an exemplary embodiment.

FIG. 8 is an illustration of a flowchart of an exemplary embodiment of the operation of media broker 12 for distributing stored media items to a media storage device 16 in proximity to a renderer 14 at which the media item is likely to be viewed. For the purposes of this exemplary embodiment, it is assumed that ASCL 92 has been created and updated as described above. First, for each of one or more media item entries in the ASCL 92, media broker 12 queries a device profile 86 associated with each media storage device 16 to determine the watch history 88 of each stored media item (step 4000). As described above, each media storage device 16 has an associated watch history 88 that records media items accessed from the media storage device 16 and the renderer 14 to which the media item was streamed or otherwise transmitted. In this manner, media broker 12 can determine, for each media item entry in the ASCL 92, where the media item was most regularly watched and where the media item is stored. As used herein, "most regularly watched" refers to a renderer 14 on which a media item has been most often rendered.

Next, media broker 12 operates to identify each media item entry in the ASCL 92 that is most regularly viewed on a renderer 14 not associated with the media storage device 16 on which the media item is stored (step 4002). While not every media storage device 16 is associated with a renderer 14, a media storage device 16 may be associated with a renderer 14 such as when both a renderer 14 and a media storage device 16 form part of a set top box (STB) or computer. Next, media broker 12 operates to transfer each media item identified in step 4002 to a media storage device 16, if any, more closely associated with a renderer 14 on which the media item is most regularly viewed (step 4004). In an exemplary embodiment, a request to record a series, as may be stored in ASRL 100, may be updated or otherwise altered so that future recordings of the series are recorded onto a media storage device 16 associated with a renderer 14 on which the media item is most regularly viewed.

In an exemplary and non-limiting embodiment, there is described herein a means for flexible storage management of media items implemented via the utilization of layered video encoding.

When a media item is recorded by a media storage device 16, the media item may be encoded using layered encoding techniques, such as, for example, Scalable Video Coding (SVC). SVC operates to encode a high-quality video bitstream that is formed of one or more individual subset bitstreams that are each derived by dropping packets from the larger bitstream. As a result, each subset bitstream, or layer, may represent a lower spatial or temporal resolution or a lower quality video signal (each separately or in combination) compared to the bitstream from which it is derived.

Scalable video coding was recently implemented within the MPEG-4/Part-10 and H.264 standards bodies. Scalable video coding allows for efficient one time compression of video content suitable for multiple quality levels of playback requiring the given client device to only receive the needed bandwidth for the playback client. This is accomplished by generating multiple layers during the video compression process.

A base layer (or stream) provides minimum bandwidth support for playback (i.e., the lowest quality level, frame rate, and resolution) needed by any client. Clients with higher-level playback capabilities may select to receive one or more enhancement layers increasing quality, frame rate, and/or resolution. A more complete description of H.264 scalable video coding can be found in the following white paper: "Overview of the H.264/AVC Video Coding Standard," Thomas Wiegand, Gary J. Sullivan, Senior Member, IEEE, Gisle Bjøntegaard, and Ajay Luthra, Senior Member, IEEE paper, which is hereby incorporated herein by reference in its entirety.

In accordance with an exemplary embodiment, a media item is represented by multiple layers, each layer providing additional quality (such as definition, resolution, color, details). The following example illustrates an exemplary embodiment according to the disclosure below. Fred records the SuperBowl in HD on media storage device 16, such as a DVR. Fred's wife records episodes of America's Next Top Model on the same media storage device 16. One day, media storage device 16 runs out of storage space, such as on media storage repository 58, and needs to reclaim storage space. Fred has his media storage device 16 configured to give higher preference to HD sports content than reality TV content. His wife declines to alter the configuration because high video quality is not required to appreciate reality TV drama. As a result, media storage device 16 deletes the highest enhancement layer of all Top Model episodes to make space for the current episode. In addition, the current episode is encoded with lower quality to match the resulting quality of all the previously recorded episodes, thus consuming even less space. Fred is able to watch his SuperBowl recording in full HD quality while Fred's wife is able to watch all her Top Model episodes at relatively lower, but acceptable, quality.

Figure 9:
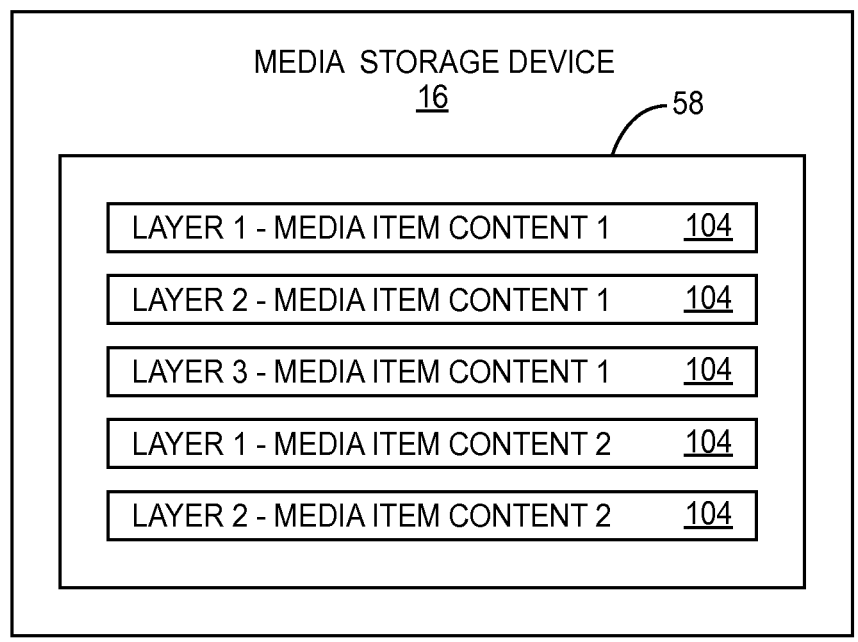
FIG. 9 is a diagram of a media storage repository storing one or more media content item layers according to an exemplary embodiment.

FIG. 9 is a diagram of a media storage device 16 showing media storage repository 58 comprising one or more media items each comprising one or more media content layers 104. As illustrated, media item "1" is comprised of three media content layers 104 while media item "2" is comprised of two media content layers 104. While illustrated as stored in the same media storage repository 58, media content layers 104 associated with a single media item may be stored in different media storage repositories 58 which may reside on the same or different media storage devices 16. In accordance with an exemplary embodiment, information describing each media content layer 104 may be stored, for example, in record history 90 in a media storage device data structure 56 associated with a media storage device 16 upon which all or part of a media item is stored. In this manner, each media content layer 104 may be stored separately while remaining logically associated with the original media item.

Figure 10:
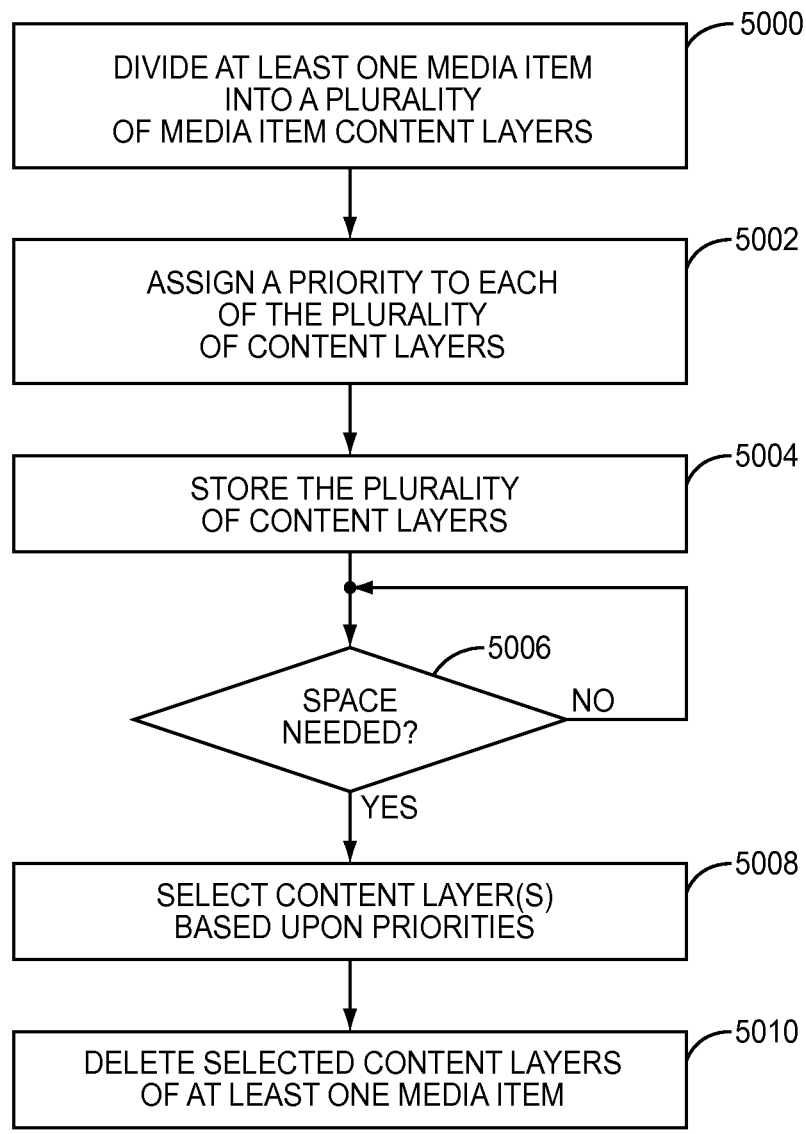
FIG. 10 is a flow chart illustrating the operation of the system of FIG. 1 when storing and deleting media item content layers according to an exemplary embodiment.

FIG. 10 is an illustration of a flowchart of an exemplary embodiment of the operation of system 10 for managing storage and deletion of a media item. First, as described above, a media item is divided into a plurality of media content item layers 104 (step 5000). Next, each media content item layer 104 is assigned a priority (step 5002) which is stored, for example, in a media storage device data structure 56. In accordance with exemplary embodiments, each media item layer's priority may be derived from a number of criteria, including, but not limited to (1) a user's preferences and configuration, (2) a rating of the media item, (3) a history, including how many times does someone watch this type of content and how do they watch it (i.e., do they utilize all the media content item layers 104), (3) heuristics, (4) social network filters, and the like. In an exemplary embodiment, steps 5000-5002 may be performed by media broker 12. In yet other embodiments, steps 5000-5002 may be performed by one or more media storage devices 16.

Next, the plurality of media content item layers 104 are stored on one or more media storage devices 16 (step 5004). In an exemplary embodiment, the media content item layers 104 having a lower priority are stored on a different section (preferably a contiguous section) of a media storage repository 58 than are the higher priority media content item layers 104. Alternatively, or in addition, media content item layers for multiple media items that are more likely to be deleted at the same time (i.e. media content item layers 104 with the same or similar priority), are grouped together and stored in contiguous storage sections. As a result, if lower priority media content item layers 104 of multiple media items need to be deleted, a contiguous section of the storage media forming a part of a media storage device 16 will be reclaimed, thus avoiding fragmentation of available storage media (disk fragmentation). Thus, the management of storage space on media storage devices 16 becomes simpler. Specifically, as more and larger contiguous blocks become available, proliferation of small fragments of unused storage is avoided. Further, resource intensive operations (such as disk de-fragmentation) can be avoided. In yet another embodiment, these low priority media content item layers 104 may be stored on a separate contiguous section of the storage space of another media storage device 16 communicatively coupled to the network 20.

Next, a check is performed to determine if additional storage space needs to be reclaimed to enable storage of more media items (step 5006). If it is determined that additional storage space is needed, one or more media item content layers 104 are selected based on their associated priorities (step 5008) and deleted (step 5010). Specifically, media content item layers 104 with lower priorities are deleted before those with higher priorities. The result is that storage space is made available by deleting portions of one or more media items, yet none of the recorded media items is completely deleted. In an exemplary embodiment, when directing the deletion of one or more media content item layers 104, media broker 12 may alert a user. For example, media broker 12 may access information from a user data structure 24, and utilize the information to send an alert to a user informing the user of the impending deletion. In an exemplary embodiment, these alerts are text messages sent to mobile devices, such as mobile phones, PDAs, and the like, associated with a user.

Figure 11:
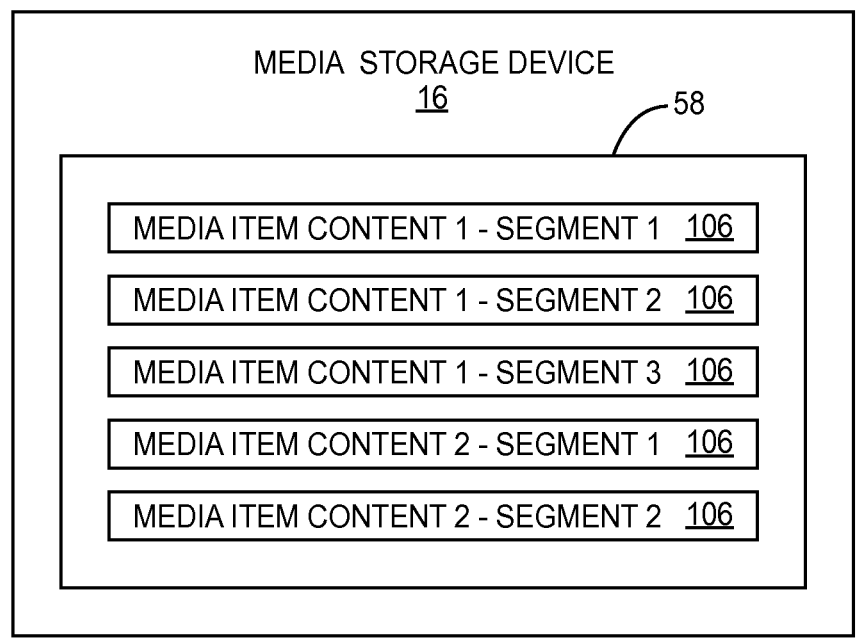
FIG. 11 is a diagram of a media storage repository storing one or more media content item segments according to an exemplary embodiment.

FIG. 11 is a diagram of a media storage device 16 showing media storage repository 58 comprising one or more media items each comprising one or more media content segments 106. As illustrated, media item "1" is comprised of three media content segments 106 while media item "2" is comprised of two media content segments 106. While illustrated as stored in the same media storage repository 58, media content segments 106 associated with a single media item may be stored in different media storage repositories 58 which may reside on the same or different media storage devices 16. In contrast to the one or more media content layers 104 that may be used to form a media item, a single media item may be divided lengthwise into one or more media content segments 106. In accordance with an exemplary embodiment, information describing each media content segment 106 may be stored, for example, in record history 90 in a media storage device data structure 56 associated with a media storage device 16 upon which all or part of a media item is stored. In this manner, each media content segment 106 may be stored separately while remaining logically associated with the original media item.

Figure 12:
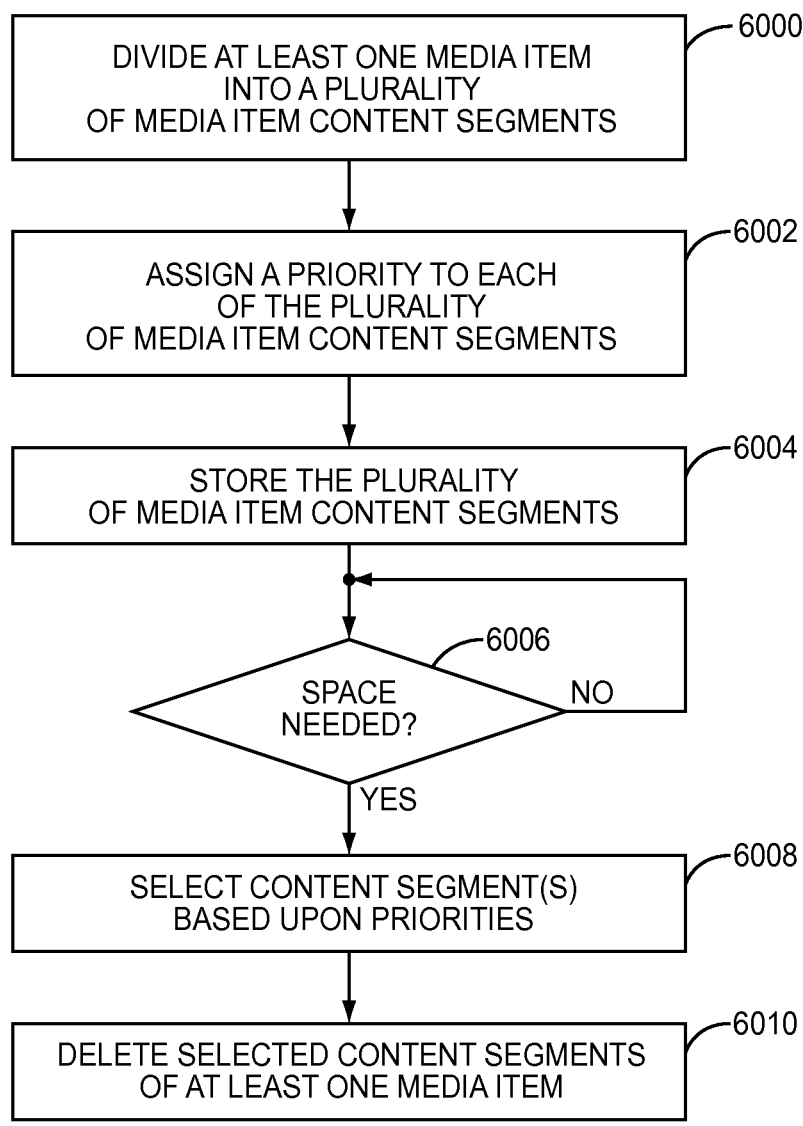
FIG. 12 is a flow chart illustrating the operation of the system of FIG. 1 when storing and deleting media item content segments according to an exemplary embodiment.

FIG. 12 is an illustration of a flowchart of an exemplary embodiment of the operation of a media broker 12 for managing storage and deletion of media items. First, as described above, a media item is divided into a plurality of media content item segments 106 (step 6000). In an exemplary embodiment, media content metadata is analyzed, such as by media broker 12, to identify entire segments of the media item that the user is not interested in, and hence likely to skip. Examples of media content item segments 106 include, but are not limited to, advertisements, end credits, undesirable content, scenes requiring parental controls, scenes without Meg Ryan, etc. Such media content item segments 106 are identified during or after recording the media item, and associated with a priority lower than the priority assigned to other media content item segments 106.

Then, each media content item segment 106 is assigned a priority (step 6002) and stored (step 6004). In accordance with an exemplary embodiment, portions of media item identified during the recording process, such as by examining media item metadata, as media content item segments 106 having a low priority are recorded on a different, contiguous section of a media storage repository 58 of a media storage device 16. In an exemplary embodiment, this may be accomplished by temporarily storing the media item in memory, such as a buffer, and only writing it to the media storage repository 58 when the media item metadata has been analyzed and a priority assigned to each of one or more media content item segments 106. In an exemplary embodiment, the temporary storage of a media item, as well as the analysis thereof, may be performed by the media broker 12. As a result, when low priority media content item segments 106 need to be deleted, a contiguous section of the media item repository will be reclaimed, thus avoiding fragmentation of available media item repository (for instance, disk fragmentation).

As a result, the management of stored media content item segments 106 becomes simpler. For example, more and larger contiguous blocks become available, avoiding the proliferation of small fragments of unused storage. In addition, computationally burdensome operations such as disk de-fragmentation can be avoided. In yet another exemplary embodiment, low priority media content item segments 106 may be stored on a separate contiguous section of the storage space of another media storage device 16 communicatively coupled to network 20.

If metadata is not available as part of the media item, the media item may be analyzed, such as by media broker 12, to generate metadata for use in segmenting media items. In another exemplary embodiment, virtual layers may be prioritized as well. As used herein, a "virtual layer" is an additional layer of data that may be segmented that does not form a part of a media item but is associated with the media item. For example, a media item comprising a film may be packaged with additional professional video clips such as, "missing scenes", "out-takes", etc. In addition, user-generated annotations may be associated with and stored along with the media item. Virtual layers may be saved with the media item at the time of download or added at a later time. As is evident, virtual layers may be external files or components included within the original media item. For example, in a video format such as MPEG-7, additional components may be stored in conjunction with the original video. Another form of virtual layers involves prioritizing segments of the media item. For example, if a user likes to store every NC State basketball game, the user may choose to prioritize the media content item segment 106 comprising the second half of the video over the first half. Then, when system 10 needs to reclaim some storage space, the user can at least watch the last half of the recorded games. Or, in another example, a user may choose to prioritize the media content item segment 106 comprising the first 30 minutes of Saturday Night Live over the remaining segment.

Next, a check is performed to determine if additional storage space needs to be reclaimed to enable storage of more media items (step 6006). If it is determined that additional storage space is needed, one or more media item content segments 106 are selected based on their associated priorities (step 6008) and deleted (step 6010). For example, media content item segments 106 are deleted from lowest priority to highest priority (step 6010). In accordance with an exemplary embodiment, in addition to automated deletions of media content item segments 106 based upon predetermined priorities, the identity of media content item segments 106 and/or media content item segments 106 of various content content that are deemed candidates for deletion, for example, based upon their priorities, may be displayed to a user, such as via a renderer 14, and the user may manually select which media content item layers 104 and/or media content item segments 106 should be deleted.

In another exemplary embodiment, when directing the deletion of one or more media content item segments 106, media broker 12 may alert a user. For example, media broker 12 may access information from a user data structure 24, and utilize the information to send an alert to a user informing the user of the impending deletion. In an exemplary embodiments, these alerts are text messages sent to mobile devices, such as mobile phones, PDAs, and the like, associated with a user.

In accordance with another exemplary embodiment, system 10 maintains user preferences that proactively allow users to create media content item subscriptions, create personal time-shifted content queues for each user, and create aggregated media content item queues prioritized according to the interests of a subset of users who are trying to find media items to watch together. Users are further enabled to register when all subscribed users have viewed the media item, and rotate the media item out of the one or more media storage devices 16 on which it is stored when all users are done with viewing the media item.

The following example illustrates an exemplary embodiment according to the disclosure below. Fred has three media storage devices 16 (e.g., DVRs) in his house. Fred is busy working on a big project for work and is tired of wasting time programming his DVRs so that he doesn't miss any media item that he wants to see while he is working late this week. As a result, Fred creates a user recording subscription profile on his home system 10. Specifically, Fred specifies that he likes channels USA, HBO, and ESPN, genres Drama and Sports, content with a rating of 4 stars or better, and content that his son also enjoys. Fred registers his recording subscription update, and the system 10 proceeds to record all drama and sports programs from Fred's favorite channels.

In accordance with an exemplary embodiment, users of system 10 may define a recording subscription profile that describes in general the types of media items that they would like system 10 to record for them and to associate with their individual user programming queue such as recorded in the queue 54 of user data structure 24. The recording subscription profile may be stored, for example, in the preference settings 48 of user data structure 24. As described below, a recording subscription profile is comprised of a plurality of attributes that are user selectable, including, for example, preferred channels, preferred genres, preferred ratings and the like.

Figure 13:
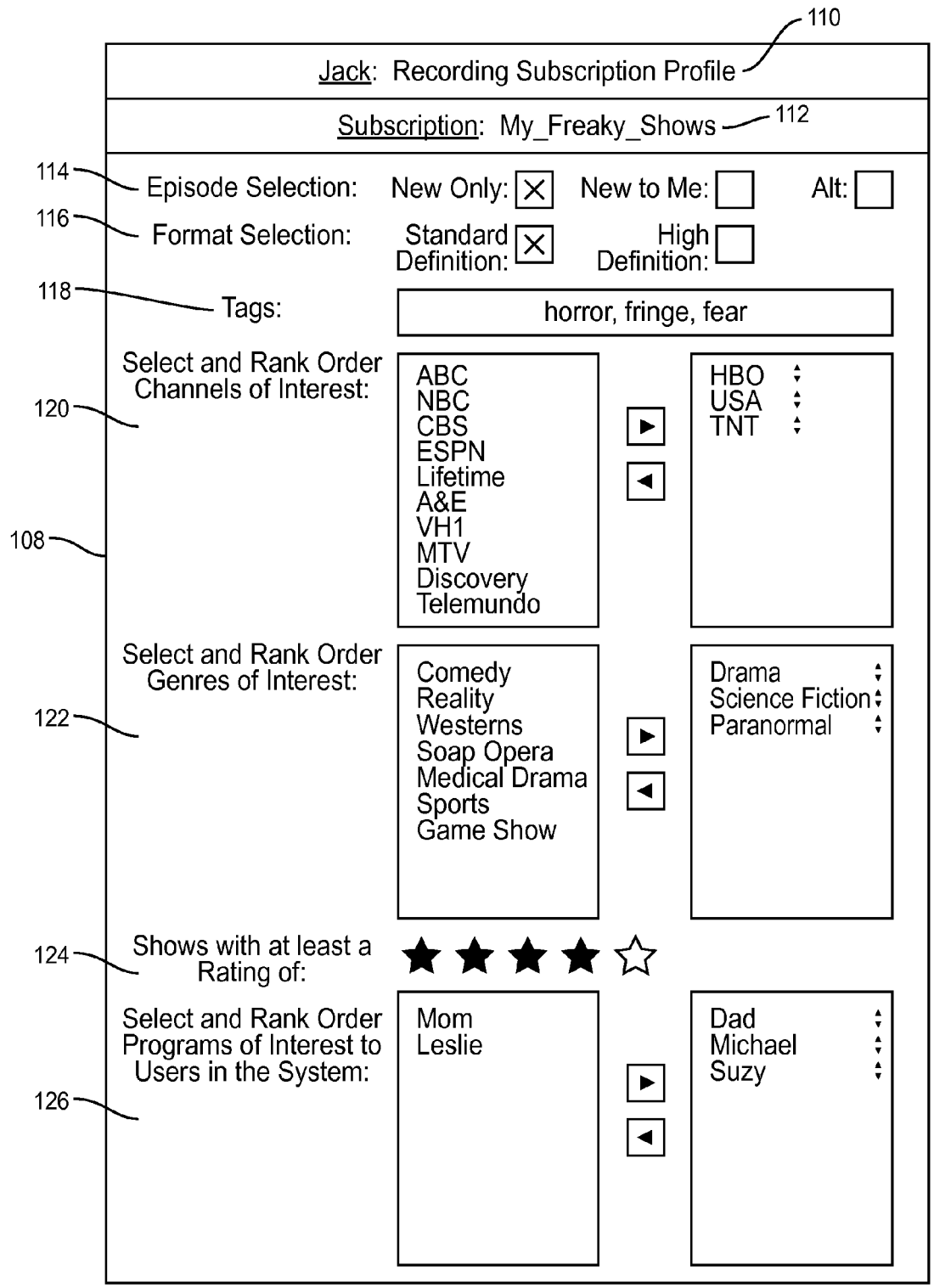
FIG. 13 is an illustration of an exemplary GUI for identifying media item preferences according to an exemplary embodiment.

Recording subscription profiles may be used to intelligently record media items for all users of system 10. FIG. 13 is an illustration of an exemplary GUI 108 that may be displayed, for example, on a renderer 14 to collect information for a recording subscription profile. As illustrated, GUI 108 has a subscription field 112 for identifying the name of the recording subscription profile. GUI 108 further includes a user section 110 for identifying the user associated with the recording subscription profile. GUI 108 further includes an episode selection section 114 for defining media item episodes the user wants to see (e.g., only new ones, only new to the user, all). GUI 108 further includes a format selection section 116 for defining desired formats (e.g., standard definition or high definition). GUI 108 further includes a tags selection section 118 for requesting media items with specific tags (e.g., horror, fringe, fear). GUI 108 further includes a channels of interest section 120 for specifying and ranking channels of interest to the user. GUI 108 further includes a genres of interest section 122 for specifying and ranking genres of media items that the user likes. GUI 106 further includes a ratings section 124 for specifying a minimum rating of the programs that the user likes. GUI 106 further includes a program of interest to users section 126 for specifying and ranking media items that are liked by other users of system 10.

In the exemplary embodiment illustrated, a user "Jack" has created a recording subscription profile called "My_Freaky_Shows". In an exemplary embodiment, each user can create multiple different recording subscription profiles in system 10. Jack has selected that he only wants new episodes (not reruns) and that standard definition quality is acceptable. Jack has also indicated that he likes shows that have the terms "horror", "fringe", and "fear" in the tags and/or description of the media item metadata. Jack has indicated that he generally likes content from the HBO, USA Network, and TNT channels that are typically Drama, Science Fiction, and Paranormal with a rating of at least 4 stars in quality and that are also typically enjoyed by other members of the family (Dad, Michael, and Suzy). By selecting and sorting by other users in the family, Jack is further trying to target the recording of programs that would be enjoyed by other members of the family so that Jack could watch media items with them and/or because the recording subscription profiles of other family members allow a recording subscription profile created by Jack to potentially identify more targeted content for Jack.

Figure 14:
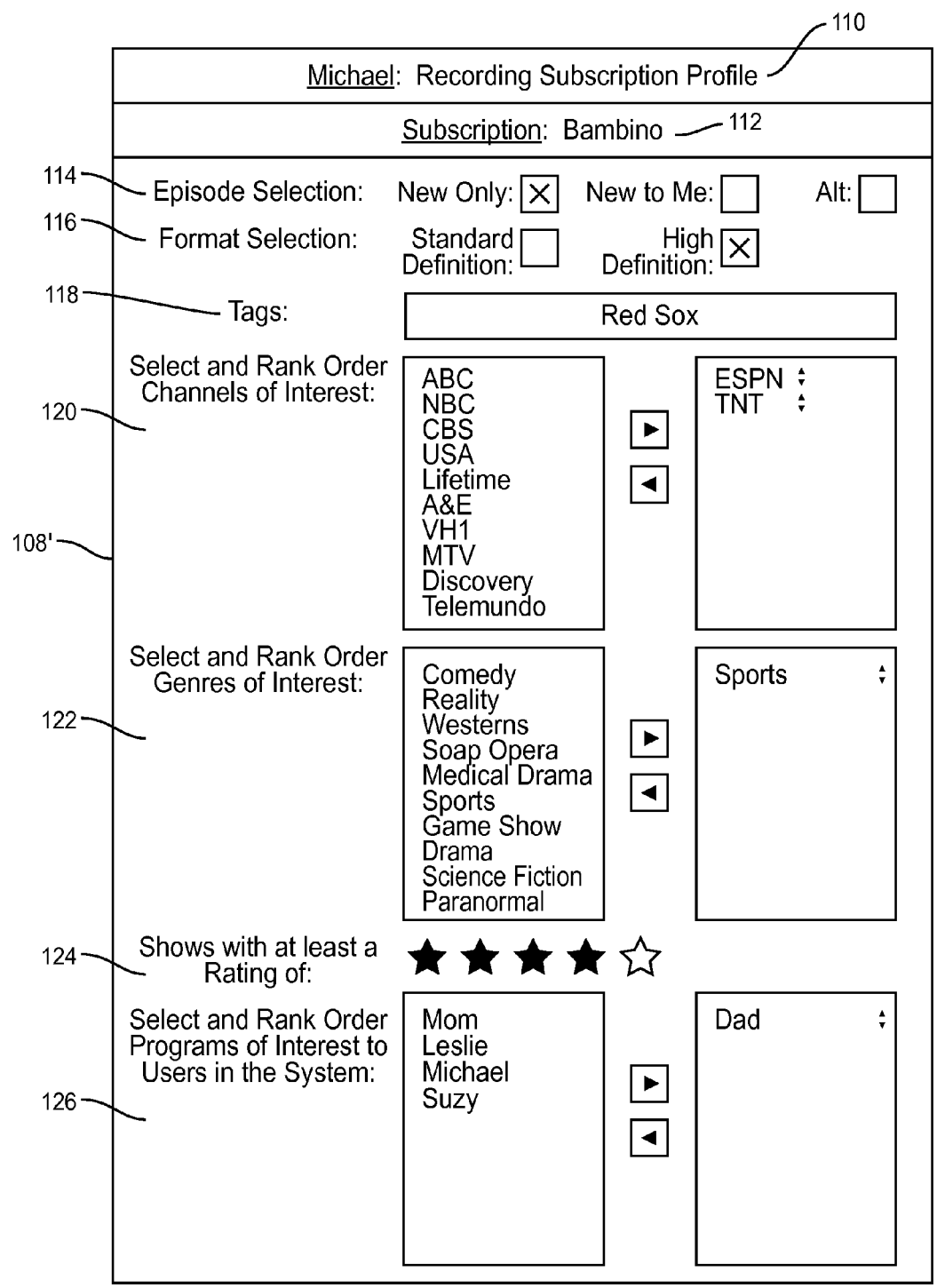
FIG. 14 is an illustration of another exemplary GUI for identifying media item preferences according to an exemplary embodiment.

FIG. 14 is an illustration of an exemplary GUI 108' that may be displayed, for example, on a renderer 14 to collect information for a recording subscription profile. As illustrated, user "Michael" sets up a recording subscription profile called "Bambino" designed to record for all of the Red Sox games. In this example, Michael identifies High Definition as the desired format, ESPN and TNT as the channels, Sports as the Genre, and tags as "Red Sox".

Figure 15:
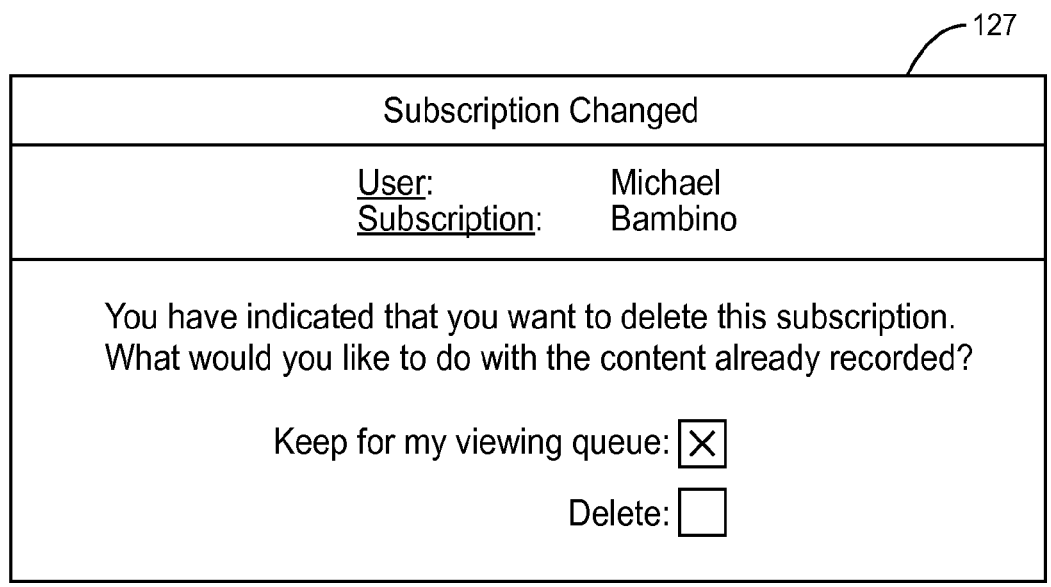
FIG. 15 is an illustration of an exemplary GUI for performing operations of the system of FIG. 1 according to an exemplary embodiment.

FIG. 15 is an illustration of an exemplary GUI 127 for use in editing or deleting a recording subscription profile. In an exemplary embodiment, GUI 127 may be displayed on a renderer 14 communicatively coupled to media broker 12. As illustrated, user "Michael" is provided the option to keep or delete the recording subscription profile "Bambino".

In accordance with another exemplary and non-limiting embodiment described below, user information associated with a recorded media item is leveraged to provide customized viewing queues for each user of system 10. As a result, rather than having to weed through all of the media items that have been recorded on system 10, a user can access and view a targeted list of media items that they have specifically subscribed to as discussed above.

FIG. 16 shows an example of a GUI 129 for providing a user with a customized view of media items stored in queue 54 associated with the user. In an exemplary embodiment, the data displayed in GUI 129 may be accessed by media broker 12 and transmitted to a renderer 14 in proximity to a user. As illustrated, filter section 128 provides a choice of a plurality of attributes, such as those comprising a recording subscription profile, by which media item information stored in a queue 54 may be filtered for display. For example, media items may be selected, ordered and displayed based upon alphabetical order, recording date, channel, genre, rating, user, and priority for deletion. In the example illustrated, the user has chosen to view media items that have been recorded according to a recording subscription profile stored in queue 54 whereby the media items, sorted by priority of deletion, are displayed in media content item section 130.

In another exemplary embodiment, information from a plurality of queues 54 associated with one or more users may be aggregated in such a way so as to facilitate the selection of media items that are suitable or desired by a subset of users who want to watch media items together.

The following example illustrates an exemplary embodiment according to the disclosure below. Fred has three DVRs in his house. Fred's big project at work is now over, and he can get caught up on all the great content that has been recording on his DVR network based on his recording subscription profile. When Fred gets home, he calls up his personalized content queue to review all of the programs recorded for him. Fred knows that he has recorded a lot of content in the last week while dealing with his project at work, so he selects the "Deletion" view to make sure he watches the programs he has recorded before they get rotated off when his system encounters capacity problems. Just then, Fred's wife comes home with the kids, and she has promised the children that they can watch one of their cartoons before bed in 30 minutes. Fred calls up the aggregated content queue for himself and his kids, sets the program duration to 30 minutes, and again calls up the "Deletion" view to make sure he and the kids watch any programs that will be deleted when the system next encounters capacity issues. Fred finds a program and watches it with his kids.

Figure 17:
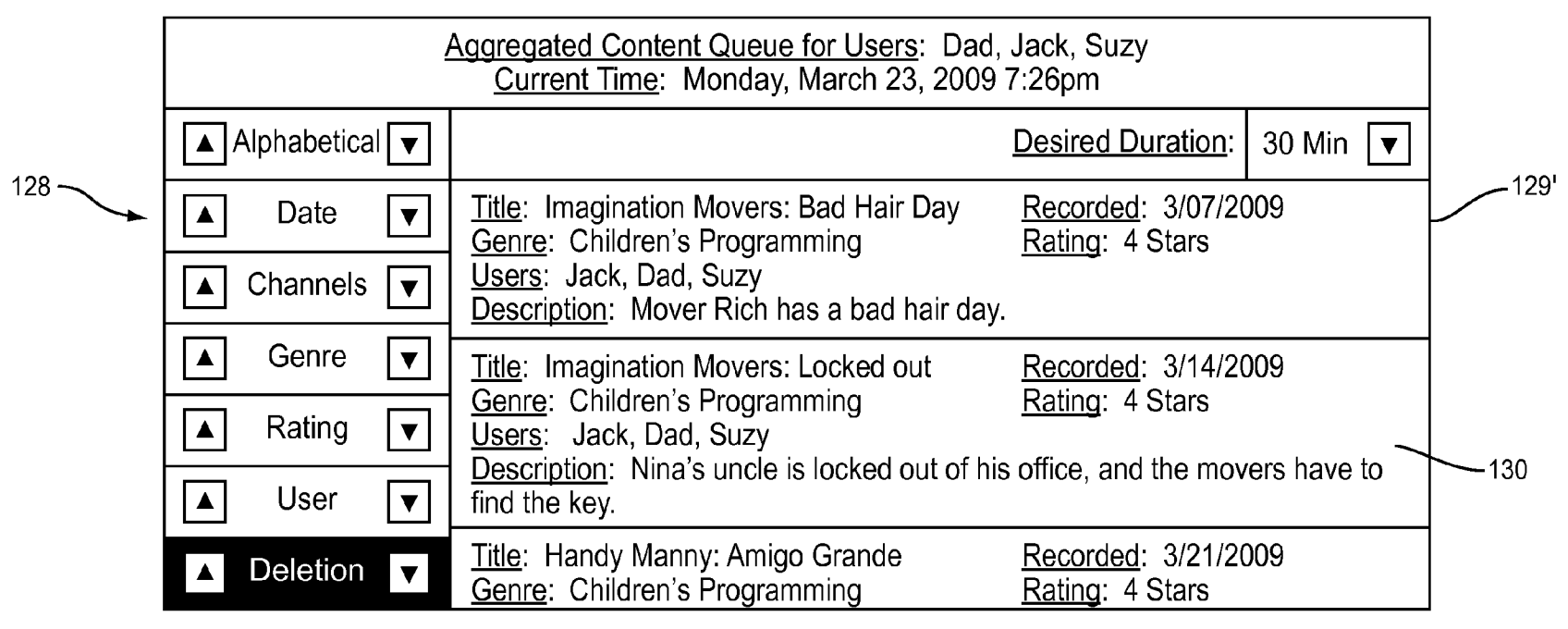

FIG. 17, is an illustration of an exemplary GUI 129' for providing a user or users with a customized view of media items stored in more than one queue 54 associated with one or more users. As illustrated, the queues 54 associated with users "Dad", "Jack" and "Suzy" are aggregated, such as by media broker 12, to include media items that match the recording subscription profiles of the three users. In the example, the displayed media content item section 130 is filtered by desired duration and may be further filtered using one or more filter selections 128.

Figure 18:
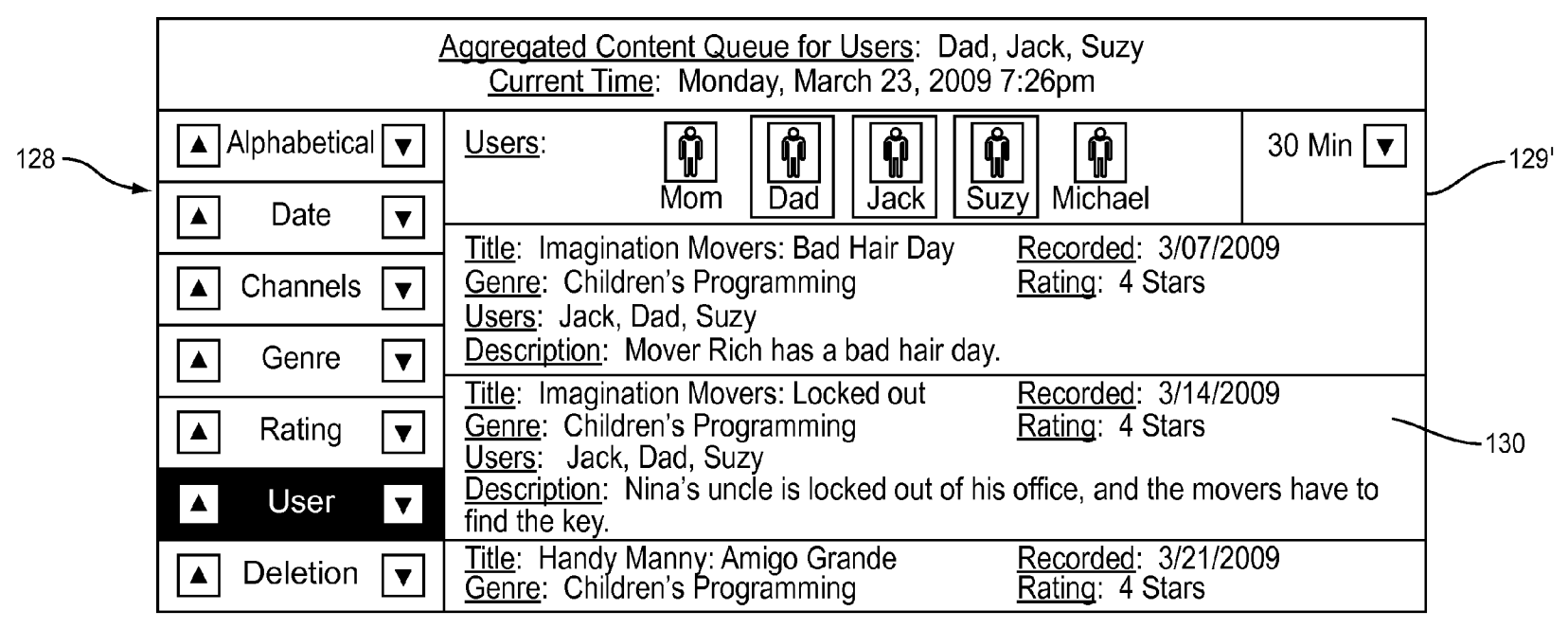

FIG. 18 is an illustration of another exemplary embodiment, the filter selection 128 chosen is "User" for sorting the displayed aggregated content of users "Dad", "Jack" and "Suzy". By sorting based on filter section 128 "User", media items of interest to Dad, Jack and Suzy are shown first, then media items only of interest to two of the users (e.g., either Dad and Jack, Jack and Suzy, or Dad and Suzy), and then media items of interest to only one user.

The following example illustrates an exemplary embodiment according to the disclosure below. Fred has three DVRs in his house. Fred's children are always filling up the DVR with reality programs and Fred never has room for the programs he likes to watch. Not wanting to be draconian with his family, Fred activates the intelligent storage optimization algorithm. Fred gives himself preferred user status and sets a network storage utilization threshold to 80%, meaning that whenever 80% or more of the storage is filled up, the intelligent algorithm will free space. Fred tells his kids that the algorithm incorporates viewership and so if they don't want their content to be automatically deleted, they should be sure to watch what they record. The family begrudgingly gives it a try and happiness ensues.

In accordance with another exemplary embodiment, user viewership of stored media items (i.e. who has watched the content and when), such as may be stored in watch history 34 associated with a user, is utilized, such as by media broker 12, as a factor in determining how to optimize storage across network 20. In particular, a robust storage optimization algorithm is disclosed.

Figure 19:
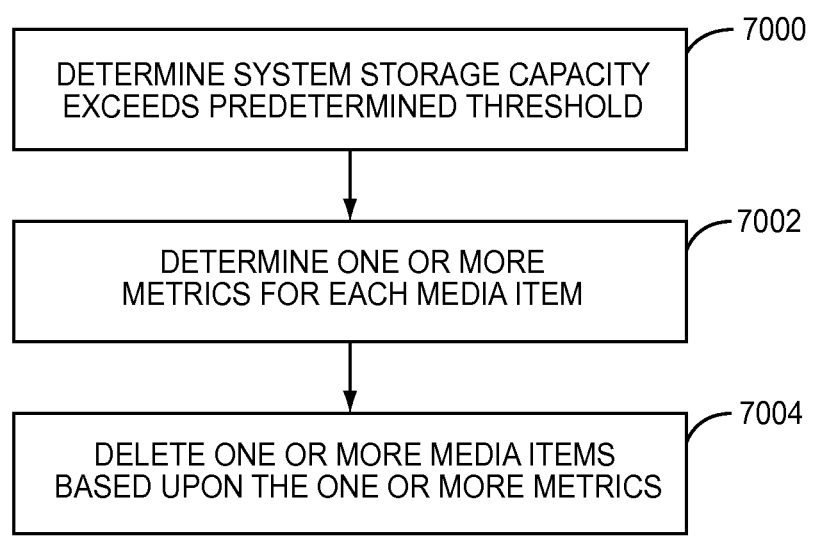
FIG. 19 is a flow chart illustrating the operation of the system of FIG. 1 according to an exemplary embodiment.

FIG. 19 is a flowchart of an exemplary embodiment of a method for managing the storage of media items. First, the overall network storage utilization is calculated from the utilizations of each media storage device 16 to determine if a threshold has been met (step 7000). For example, media broker 12 may query each media storage device 16. Such querying may be performed periodically at predetermined intervals or times or may result from a trigger, such as the storage of a media item at a media storage device 16. If it is determined that the utilization of the storage capacity of system 10 exceeds a predetermined threshold value (e.g., like 90%), then one or more metrics for one or more media items are determined (step 7002).

For example, metrics derived from one or more attributes of media items, viewing histories of media items and the like are determined with points assigned to media items based upon the derived metric for each attribute. In an exemplary embodiment, system 10 determines, such as via media broker 12, an age of each media item (i.e. how long ago the media item were recorded) stored on a media storage device 16 on the network 20. In an exemplary embodiment, media broker 12 retrieves a file stamp for each media item from the media storage device 16 upon which the media item is stored. For example, the oldest media item on network 20 is determined and the newest media item on network 20 is determined. The difference in recording age between the oldest and newest media item is scaled, for example to a scale of 1-10 and each media item is allocated points on a sliding scale proportional to the age of the media item. For example, a metric of value one (1) is assigned to the newest media item and a metric of value ten (10) is assigned to the oldest media item.

Likewise, in accordance with another exemplary embodiment, system 10 determines, such as via media broker 12, a size of each media item (i.e. the duration of the recording) stored. The longest and shortest media items are determined. As before, this size range is mapped to a scale (e.g., a scale of 1-10 with one (1) being the shortest media item and ten (10) being the longest media item) and each media is allocated points along a sliding scale proportional to the size of the media item.

Likewise, in accordance with another exemplary embodiment, system 10 determines, such as via media broker 12, which media items in system 10 have users associated with them and which viewers have watched the programs. This may be accomplished, for example, by querying each user's watch history 34 and queue 54. Media items are then assigned points based on the viewership (e.g., one (1) being assigned if no user has watched the media item yet and ten (10) being assigned if all users have viewed the media item). For example, if no users are associated with the media item, then 11 points are awarded. If 2 out of 5 users associated with the media item, such as via one or more subscription record profiles, have viewed the media item, then 4 points are awarded (mapping ⅖ths to the 10 point scale).

In accordance with an exemplary embodiment, metrics assigned to media items may differ based upon the identity of associated users. For example, users comprising parents may count for more, such as twice that of any other user. As a result, if a media item associated with five users has been viewed by only both parents, the total point value allocated for the media item may be an unscaled ⁴⁄₇ths instead of the unscaled ⅖ths of the previous example, in recognition that the viewership by each parent counts twice that of the average user of system 10.

In another exemplary embodiment, system 10 may incorporate the time differences between different users in viewing a media item. The greatest duration between subsequent viewings and the shortest duration between viewings may be calculated across all media items and mapped, for example, to a 1-10 scale. Further, points may be allocated to each media item on a sliding scale proportional to the difference between shortest and longest durations between viewings. In situations where more than two (2) viewers/users have viewed a media item, points may be awarded for each interval between viewing by any two viewers and then averaged to come up with an overall metric for the media item. In another embodiment, only the most recent interval between viewings may be used in awarding the points.

In accordance with another embodiment, system 10 may determine the difference between a present time and the last time any one viewer had viewed the media item. As above, all media items may be queried to determine a dynamic range with points allocated on a 1-10 scale (1 being the shortest time from the present time to the last viewing and 10 being the longest). Points may then be awarded proportionally to all media items across the dynamic range.

In accordance with another exemplary embodiment, a metric may be determined based upon a genre or genres of each media item. As above, the genre of each media item may be determined and ranked. The most popular genres would get the least points (because if a genre is relatively popular, it is desirable to retain media items of the genre until all viewers have viewed the media item.

In accordance with another exemplary embodiment, a metric may be determined based upon one or more recording subscription profiles. For example, media items that are not associated with an active recording subscription profile may be assigned more points than media items associated with one or more active recording subscription profiles.

After all of the metrics have been determined, such as by assigning points based upon a scale as described above, and the points allocated across all determined metrics for each media item have been summed, media items are ranked based upon the cumulative points assigned to each media item. Media items may be deleted in order of associated point values, such as from highest to lowest point values, until utilization of the storage capacity of the system 10 is below the predetermined threshold (step 7004).

FIGS. 20A and 20B are illustrations of the attributes of two exemplary media items. In particular, FIG. 20A shows the attributes of a media item having a title "Planet Earth-Deserts" while FIG. 20B shows the attributes of a media item having a title "Law and Order SVU: Hot House"

FIG. 21 is an illustration of a table showing the metrics determined and applied to each media item. Column 1 holds the individual metrics, or attributes, utilized to rank each media item. Specifically, media item metrics were derived for age, size, subscription content, number of users having viewed the media item, time between viewings, time since last viewed, genre, and rating. As illustrated, the cumulative metrics determined for the media item of FIG. 20A is forty-eight (48) and the cumulative metrics determined for the media item of FIG. 20B is forty-five (45). As a result the media item "Planet Earth" is deleted from system 10. In accordance with the method, media item "Planet Earth" is penalized because it is a large, old media item where a majority of the viewers have already viewed it. As is evident, the exemplary method described adapts to the usage and viewing patterns of users to retain only the most valuable media items.

Figure 22:
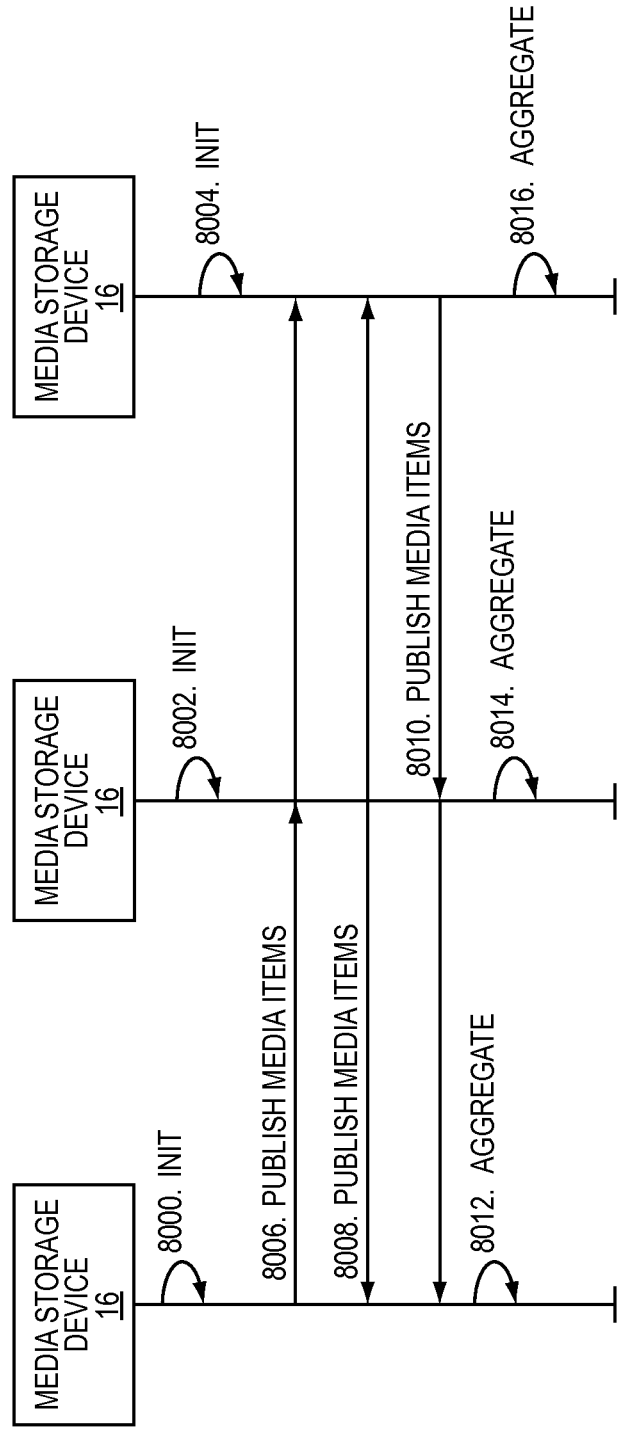
FIG. 22 is a sequence diagram illustrating the operation of the system of FIG. 1 according to an exemplary embodiment.

In an alternative exemplary and non-limiting embodiment, instead of a centralized media broker 12 querying each media storage device 16 in order to maintain a record of each stored media item, its location, and attributes associated with each media item, one or more media storage devices 16 may operate as media brokers 12. FIG. 22 is an illustration of the operation of media brokers 12 operating according to such an exemplary embodiment.

First, each media broker 12 undergoes a process of initialization during which each media broker 12 identifies, at a minimum, each media item, as well as attributes associated therewith, in, for example, each media storage repository 16 forming a part of the media storage device 16 (steps 8000-8004). Next, each media storage device 16 broadcasts or publishes information regarding each stored media item and attendant information over network 20, such as, for example, information stored in resident media storage device data structures 56, to every other media storage device 16 over network 20 for storage in their respective media storage repositories 58 (steps 8006-8010). Lastly, each media storage device 16 aggregates (steps 8012-8016) the information received from each other media storage device 16 to maintain a record of media items and information associated therewith. In this manner, each media storage device 16 functions much as a media broker 12 described above.

Figure 23:
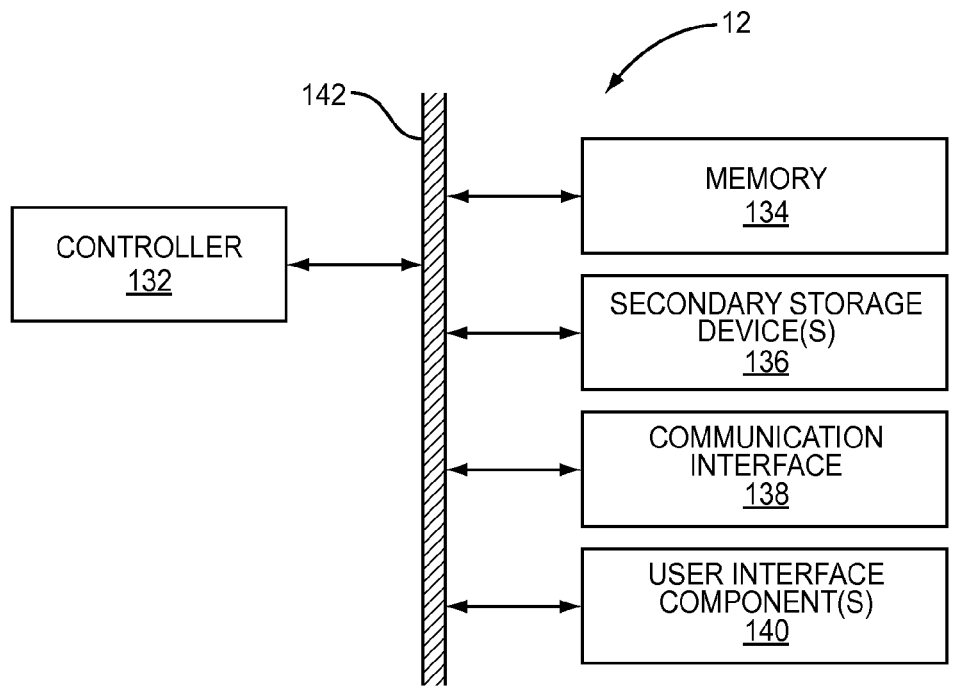
FIG. 23 is a diagram of a media broker according to an exemplary embodiment.

FIG. 23 is a block diagram of a media broker 12 of FIG. 1. As illustrated, the media broker 12 includes a controller 132 connected to memory 134, one or more secondary storage devices 136, a communication interface 138, and one or more user interface components 140 by a bus 142 or similar mechanism. The controller 132 is a microprocessor, digital ASIC, FPGA, or the like. In this embodiment, the controller 132 is a microprocessor, and software for performing the functions of media broker 12 described above is stored in the memory 134 for execution by the controller 132. Further, depending on the particular embodiment, the repositories 94, 98, 102 are stored in the one or more secondary storage devices 136. The one or more secondary storage devices 136 are digital storage devices such as, for example, one or more hard disk drives. The communication interface 138 is a wired or wireless communication interface that communicatively couples the media broker 12 to the network 20 (FIG. 1). For example, the communication interface 138 may be an Ethernet interface, local wireless interface such as a wireless interface operating according to one of the suite of IEEE 802.11 standards, a mobile communications interface such as a cellular telecommunications interface, or the like.

Figure 24:
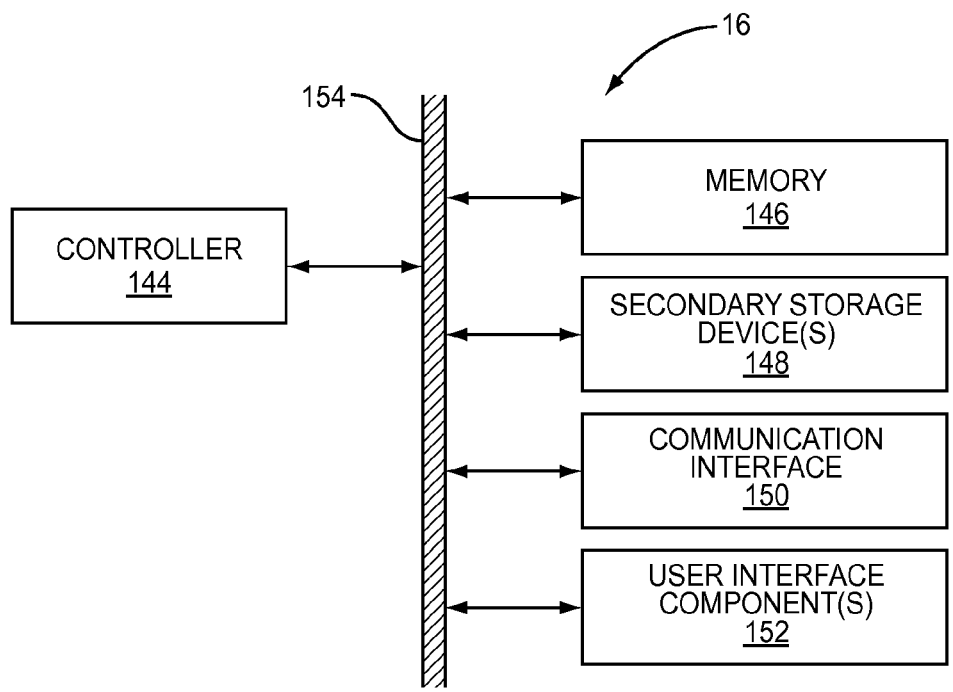
FIG. 24 is a diagram of a media storage device according to an exemplary embodiment.

FIG. 24 is a block diagram of a media storage device 16 of FIG. 1 according to one embodiment of the present disclosure. As illustrated, the media storage device 16 includes a controller 144 connected to memory 146, one or more secondary storage devices 148, a communication interface 150, and one or more user interface components 152 by a bus 154 or similar mechanism. The controller 144 is a microprocessor, digital ASIC, FPGA, or the like. In this embodiment, the controller 144 is a microprocessor, and software for performing the functions of media storage device 16 described above is stored in the memory 146 for execution by the controller 144. Further, depending on the particular embodiment, the media storage repository 58 is stored in the one or more secondary storage devices 148. The one or more secondary storage devices 148 are digital storage devices such as, for example, one or more hard disk drives. The communication interface 150 is a wired or wireless communication interface that communicatively couples the media storage device 16 to the network 20 (FIG. 1) as well to external sources of media content including, but not limited to, cable and satellite signals. For example, the communication interface 150 may be an Ethernet interface, local wireless interface such as a wireless interface operating according to one of the suite of IEEE 802.11 standards, a mobile communications interface such as a cellular telecommunications interface, or the like.

Figure 25:
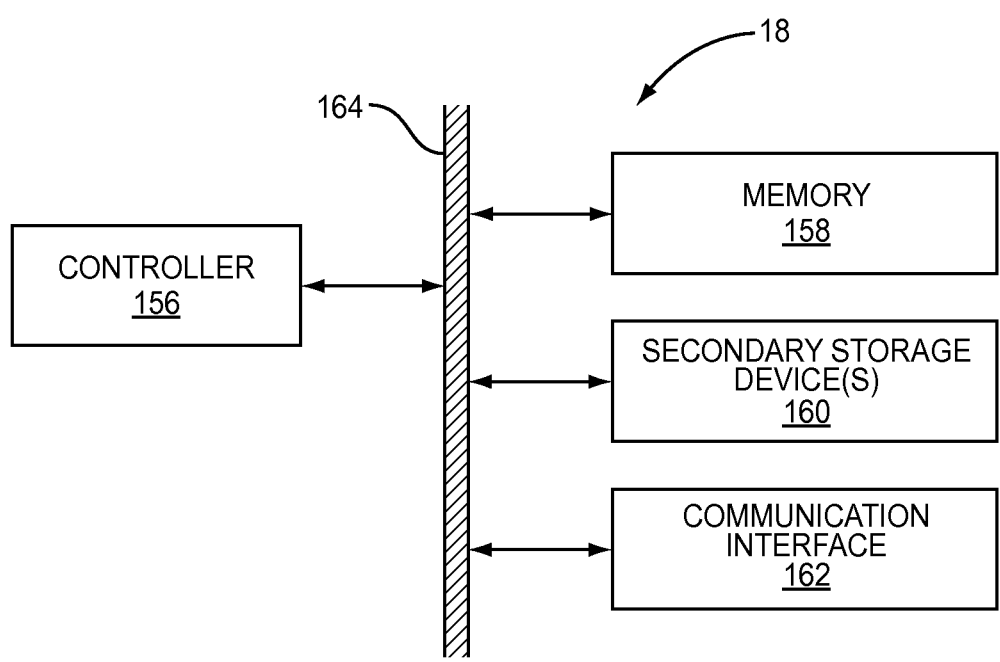
FIG. 25 is a diagram of a user server according to an exemplary embodiment.

FIG. 25 is a block diagram of a user server 18 of FIG. 1 according to one embodiment of the present disclosure. As illustrated, the user server 18 includes a controller 156 connected to memory 158, one or more secondary storage devices 160 and a communication interface 162 via a bus 164 or similar mechanism. The controller 156 is a microprocessor, digital ASIC, FPGA, or the like. In this embodiment, the controller 156 is a microprocessor, and software for performing the functions of user server 18 described above is stored in the memory 158 for execution by the controller 156. Further, depending on the particular embodiment, the user information repository 22 is stored in the one or more secondary storage devices 160. The one or more secondary storage devices 160 are digital storage devices such as, for example, one or more hard disk drives. The communication interface 162 is a wired or wireless communication interface that communicatively couples the user server 18 to the network 20 (FIG. 1). For example, the communication interface 162 may be an Ethernet interface, local wireless interface such as a wireless interface operating according to one of the suite of IEEE 802.11 standards, a mobile communications interface such as a cellular telecommunications interface, or the like.

Those skilled in the art will recognize improvements and modifications to the preferred embodiments of the present disclosure. All such improvements and modifications are considered within the scope of the concepts disclosed herein and the claims that follow.

What is claimed is:

1. A media broker comprising components including:
   a communication interface; and
   a controller associated with the communication interface configured to:
      divide at least one media item into a plurality of media content item layers, wherein dividing the at least one media item includes assigning segments of the at least one media item that have a high likelihood of being watched to a first layer and assigning segments of the at least one media item that have a high likelihood of being skipped to a second layer;
      assign a priority to each of the plurality of media content item layers, wherein a first layer of the plurality of media content item layers is assigned a higher priority than the second layer of the plurality of media content item layers;
      direct one or more media storage devices to store the plurality of media content item layers;
      subsequently determine when space is needed; and
      in response to determining that space is needed:
         select at least one of the plurality of media content item layers based upon the priority of the at least one of the plurality of media content item layers; and
         delete the at least one of the plurality of media content item layers selected to be deleted,
   wherein at least one of the components includes at least one electronic hardware component.

2. The media broker of claim 1 wherein the priority assigned to each of the plurality of media content item layers is derived from at least one of a user preference, a user configuration, a rating of the media item, and a watch history of the media item.

3. The media broker of claim 1 wherein each of the plurality of media content item layers having similar priorities are stored in contiguous portions of a storage device.

4. The media broker of claim 3 wherein the storage device comprises a part of a media storage device.

5. A non-transitory computer-readable medium embodied in an article of manufacture encoded with instructions for directing a processor to:
   divide at least one media item into a plurality of media content item layers, wherein dividing the at least one media item includes assigning segments of the at least one media item that have a high likelihood of being watched to a first layer and assigning segments of the at least one media item that have a high likelihood of being skipped to a second layer;
   assign a priority to each of the plurality of media content item layers, wherein a first layer of the plurality of media content item layers is assigned a higher priority than the second layer of the plurality of media content item layers;
   direct one or more media storage devices to store the plurality of media content item layers;
   subsequently determine when space is needed; and in response to determining that space is needed:
  select at least one of the plurality of media content item layers based upon the priority of the at least one of the plurality of media content item layers; and
  delete the at least one of the plurality of media content item layers selected to be deleted.

6. The computer-readable medium of claim 5 wherein the priority assigned to each of the plurality of media content item layers is derived from at least one of a user preference, a user configuration, a rating of the media item, and a watch history of the media item.

7. The computer-readable medium of claim 5 wherein each of the plurality of media content item layers having similar priorities are stored in contiguous portions of a storage device.

8. The computer-readable medium of claim 7 wherein the storage device comprises a part of a media storage device.

9. A method comprising:
  dividing at least one media item into a plurality of media content item layers, wherein dividing the at least one media item includes assigning segments of the at least one media item that have a high likelihood of being watched to a first layer and assigning segments of the at least one media item that have a high likelihood of being skipped to a second layer;
  assigning a priority to each of the plurality of media content item layers, wherein a first layer of the plurality of media content item layers is assigned a higher priority than the second layer of the plurality of media content item layers;
  directing one or more media storage devices to store the plurality of media content item layers;
  subsequently determining when space is needed; and
  in response to determining that space is needed:
    selecting at least one of the plurality of media content item layers based upon the priority of the at least one of the plurality of media content item layers; and
    deleting the at least one of the plurality of media content item layers selected to be deleted,
  wherein at least one of the preceding actions is performed on at least one electronic hardware component.

10. The method of claim 9 wherein the priority assigned to each of the plurality of media content item layers is derived from at least one of a user preference, a user configuration, a rating of the media item, and a watch history of the media item.

11. The method of claim 9 wherein each of the plurality of media content item layers having similar priorities are stored in contiguous portions of a storage device.

12. The method of claim 10 wherein the storage device comprises a part of a media storage device.

13. A media broker comprising components including:
  a communication interface; and
  a controller associated with the communication interface configured to:
    divide at least one media item into a plurality of media content item segments, wherein dividing the at least one media item includes assigning segments of the at least one media item that have a high likelihood of being watched to a first layer and assigning segments of the at least one media item that have a high likelihood of being skipped to a second layer;
    assign a priority to each of the plurality of media content item segments, wherein a first layer of the plurality of media content item layers is assigned a higher priority than the second layer of the plurality of media content item layers;
    direct one or more media storage devices to store the plurality of media content item segments;
    subsequently determine when space is needed; and
    in response to determining that space is needed:
      select at least one of the plurality of media content item segments based upon the priority of the at least one of the plurality of media content item segments; and
      delete the at least one of the plurality of media content item segments selected to be deleted,
  wherein at least one of the components includes at least one electronic hardware component.

14. The media broker of claim 13 wherein the at least one media item is divided based upon metadata associated with the media item.

15. The media broker of claim 13 wherein the priority assigned to each of the plurality of media content item segments is derived from at least one of a user preference, a user configuration, a rating of the media item, and a watch history of the media item.

16. The media broker of claim 13 wherein each of the plurality of media content item segments having similar priorities are stored in contiguous portions of a storage device.

17. The media broker of claim 16 wherein the storage device comprises a part of a media storage device.

18. A non-transitory computer-readable medium embodied in an article of manufacture encoded with instructions for directing a processor of a media broker to:
  divide at least one media item into a plurality of media content item segments, wherein dividing the at least one media item includes assigning segments of the at least one media item that have a high likelihood of being watched to a first layer and assigning segments of the at least one media item that have a high likelihood of being skipped to a second layer;
  assign a priority to each of the plurality of media content item segments, wherein a first layer of the plurality of media content item layers is assigned a higher priority than the second layer of the plurality of media content item layers;
  direct one or more media storage devices to store the plurality of media content item segments;
  subsequently determine when space is needed; and
  in response to determining that space is needed:
    select at least one of the plurality of media content item segments based upon the priority of the at least one of the plurality of media content item segments; and
    delete the at least one of the plurality of media content item segments selected to be deleted.

19. The computer-readable medium of claim 18 wherein the at least one media item is divided based upon metadata associated with the media item.

20. The computer-readable medium of claim 18 wherein the priority assigned to each of the plurality of media content item segments is derived from at least one of a user preference, a user configuration, a rating of the media item, and a watch history of the at least one media item.

21. The computer-readable medium of claim 18 wherein each of the plurality of media content item segments having similar priorities are stored in contiguous portions of a storage device.

22. The computer-readable medium of claim 21 wherein the storage device comprises a part of a media storage device.

23. A method comprising:
dividing at least one media item into a plurality of media content item segments, wherein dividing the at least one media item includes assigning segments of the at least one media item that have a high likelihood of being watched to a first layer and assigning segments of the at least one media item that have a high likelihood of being skipped to a second layer;
assigning a priority to each of the plurality of media content item segments, wherein a first layer of the plurality of media content item layers is assigned a higher priority than the second layer of the plurality of media content item layers;
directing one or more media storage devices to store the plurality of media content item segments;
subsequently determining when space is needed; and
in response to determining that space is needed:
selecting at least one of the plurality of media content item segments based upon the priority of the at least one of the plurality of media content item segments; and
deleting the at least one of the plurality of media content item segments selected to be deleted,
wherein at least one of the preceding actions is performed on at least one electronic hardware component.

24. The method of claim 23 wherein the at least one media item is divided based upon metadata associated with the media item.

25. The method of claim 23 wherein the priority assigned to each of the plurality of media content item segments is derived from at least one of a user preference, a user configuration, a rating of the media item, and a watch history of the media item.

26. The method of claim 23 wherein each of the plurality of media content item segments having similar priorities are stored in contiguous portions of a storage device.

27. The method of claim 26 wherein the storage device comprises a part of a media storage device.

* * * * *